(12) United States Patent
Shirahashi et al.

(10) Patent No.: US 10,087,877 B2
(45) Date of Patent: Oct. 2, 2018

(54) FUEL INJECTION CONTROL METHOD AND FUEL INJECTION CONTROL DEVICE FOR COMPRESSION SELF-IGNITION ENGINE

(71) Applicant: MAZDA MOTOR CORPORATION, Hiroshima (JP)

(72) Inventors: Naotoshi Shirahashi, Hiroshima (JP); Tsunehiro Mori, Hiroshima (JP); Takeshi Matsubara, Hiroshima (JP); Takahiro Yamamoto, Hiroshima (JP); Takeshi Inazumi, Hiroshima (JP); Keisuke Kawahara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/380,715

(22) Filed: Dec. 15, 2016

(65) Prior Publication Data

US 2017/0184049 A1 Jun. 29, 2017

(30) Foreign Application Priority Data

Dec. 24, 2015 (JP) .................................. 2015-252580

(51) Int. Cl.
*F02D 41/40* (2006.01)
*F02B 3/12* (2006.01)
(Continued)

(52) U.S. Cl.
CPC .............. *F02D 41/403* (2013.01); *F02B 3/12* (2013.01); *F02D 41/1497* (2013.01);
(Continued)

(58) Field of Classification Search
CPC .... F02D 41/401; F02D 41/402; F02D 41/403; F02D 41/405; F02D 41/1497; F02D 41/1498; F02D 2041/288
(Continued)

(56) References Cited

U.S. PATENT DOCUMENTS 4,556,030 A * 12/1985 Aono ..................... F02D 35/023
                                                 123/406.42
5,093,792 A *  3/1992 Taki ....................... F02D 35/023
                                                 701/111

(Continued)

FOREIGN PATENT DOCUMENTS

JP    2002-047975 A    2/2002
JP    2017-115723 A    6/2017

OTHER PUBLICATIONS

An Office Action; "Notice of Reasons for Rejection," mailed by the Japanese Patent Office on Sep. 4, 2017, which corresponds to Japanese Patent Application No. 2015-252580 and is related to U.S. Appl. No. 15/380,715; with its English Machine translation.

*Primary Examiner* — Mahmoud Gimie
(74) *Attorney, Agent, or Firm* — Studebaker & Brackett PC

(57) ABSTRACT

The compression self-ignition engine fuel injection control device is configured to, during one combustion stroke, perform multiple fuel injections to induce multiple combustions in a cylinder. The fuel injection control device comprises a PCM (70) configured to set an interval between a pre-injection and a main injection in the multiple fuel injections, so as to allow valley regions of a curve indicative of a frequency characteristic of a combustion pressure wave generated by the multiple combustions to fall within respective ranges of a plurality of resonant frequency bands of a structure of an engine body of the engine, wherein the PCM is operable to increase a fuel injection amount of the pre-injection more largely as an engine load becomes lower at the same engine speed.

9 Claims, 17 Drawing Sheets

(51) Int. Cl.
*F02D 41/14* (2006.01)
*F02D 41/38* (2006.01)
*F02D 41/28* (2006.01)

(52) U.S. Cl.
CPC .......... *F02D 41/401* (2013.01); *F02D 41/405* (2013.01); *F02D 2041/288* (2013.01); *F02D 2200/10* (2013.01)

(58) Field of Classification Search
USPC .................. 123/299, 300, 304, 472, 478
See application file for complete search history.

(56) References Cited

U.S. PATENT DOCUMENTS

| | | | | |
|---|---|---|---|---|
| 5,361,213 A | * | 11/1994 | Fujieda | B60K 31/0008 123/406.38 |
| 2015/0090217 A1 | * | 4/2015 | Kuzuyama | F02D 41/1497 123/299 |

* cited by examiner

At frequency F41

At frequency F42

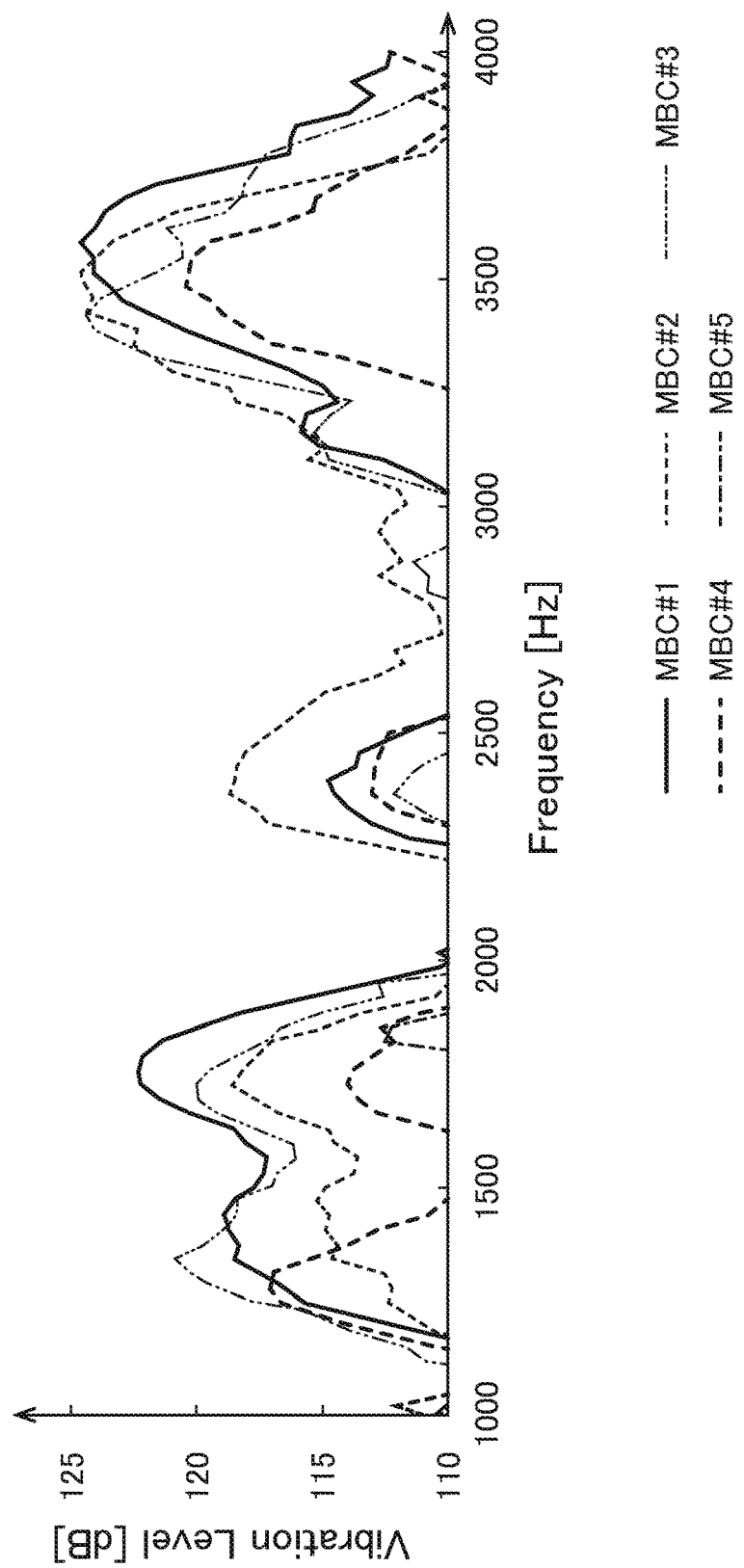

FUEL INJECTION CONTROL METHOD AND FUEL INJECTION CONTROL DEVICE FOR COMPRESSION SELF-IGNITION ENGINE

TECHNICAL FIELD

The present invention relates to a fuel injection control method and device for a compression self-ignition engine, and more particularly to a fuel injection control method and device for a compression self-ignition engine configured to, during one combustion stroke, perform multiple fuel injections to induce multiple combustions in a cylinder.

BACKGROUND ART

Heretofore, various attempts have been made to reduce sound noise of a diesel engine (in particular, sound noise caused by engine knocking (this sound noise will hereinafter be referred to simply as "knocking sound"). For example, the following Patent Document 1 proposes a technique of calculating, as a target value of a generation time lag between respective ones of a plurality of combustion pressure waves generated, respectively, by multiple fuel injections, a time lag for enabling a pressure level in a high frequency region to be reduced by means of interference between the combustion pressure waves, and, based on this target value, controlling an interval at which the multiple fuel injections are performed (interval between the multiple fuel injections). This technique intends to achieve reduction of knocking sound by controlling the fuel injection interval to reduce frequency components of an in-cylinder pressure while targeting a specific frequency band (2.8 to 3.5 kHz). As used in this specification, the term "combustion pressure wave" means a pressure wave generated by a phenomenon that an in-cylinder pressure rapidly rises according to combustion in an internal combustion engine, wherein this pressure wave is equivalent to a result obtained by temporally differentiating a waveform of the in-cylinder pressure.

CITATION LIST

Patent Document

Patent Document 1: JP 2002-047975A

SUMMARY OF INVENTION

Technical Problem

Knocking sound emitted from an engine body has properties depending on a vibration transmission characteristic of a structure (component assembly) of the engine body particularly, a resonant frequency of the structure of the engine body. Specifically, knocking sound tends to become larger in a frequency band including a resonant frequency of the structure of the engine body (resonances of a plurality of components on a main transmission path of the engine body are combined to form a frequency band having a certain level of width. In this specification, such a resonant frequency-related bond will be referred to as "resonant frequency band"). Generally, in the structure of the engine body, there are a plurality of resonant frequency bands. Thus, the technique described in the Patent Document 1 can reduce only a knocking sound having a specific frequency band of 2.8 to 3.5 kHz, but fails to adequately reduce respective knocking sound components corresponding to the plurality of resonant frequency bands of the structure of the engine body.

Meanwhile, knocking sound has a characteristic depending on an in-cylinder pressure level equivalent to a combustion-generated vibration exciting force, in addition to the above resonances of the structure of the engine body (The in-cylinder pressure level, generally called "CPL (Cylinder Pressure Level)", means high-frequency energy derived by subjecting an in-cylinder pressure waveform as an index of a combustion-generated vibration excitation force to Fourier transform. This term will hereinafter be abbreviated as "CPL"). The CPL has a value depending on a heat release rate indicative of an in-cylinder combustion state. As a result of experiments conducted by the present inventors, it was found that a waveform of the heat release rate is changed under an influence of environmental conditions such as temperature and pressure, and knocking sound comes under an influence of a shape of the waveform of the heat release rate. Therefore, the present inventors considered that, for adequately reducing knocking sound, it is desirable to set an interval between the multiple fuel injections, based on a timing which reflects the influence of environmental conditions such as temperature and pressure, and enables the heat release rate to be maximized (have a peak). The technique described in the Patent Document 1 is not enough to adequately reduce knocking sound, because it is configured to control an interval between the multiple fuel injections, based on a rising timing of a combustion pressure wave (which corresponds to a timing at which the heat release rate starts rising.

Moreover, in a situation where fuel ignitability in an engine combustion chamber is poor, e.g., when an engine load is relatively low or during an engine cold-start, an ignition delay after fuel injection occurs to undesirably cause delay in a timing of enabling the heat release rate to be maximized. In this situation, there is a possibility that, even if the interval between the multiple fuel injections is set, based on the timing of enabling the heat release rate to be maximized, the heat release rate cannot be maximized at an intended timing, and thereby knocking sound cannot be sufficiently reduced.

The present invention has been made to solve the above conventional problem, and an object thereof is to provide a compression self-ignition engine fuel injection control method and device capable of adequately reducing a knocking sound corresponding to a resonant frequency of a structure of an engine body of the engine, in a broad range of ignition environments.

Solution to Technical Problem

In order to achieve the above object, according to a first aspect of the present invention, there is provided a fuel injection control method for a compression self-ignition engine configured to, during one combustion stroke, perform multiple fuel injections to induce multiple combustions in a cylinder. The fuel injection control method comprises: a step of setting an interval between a pre-injection and a main injection in the multiple fuel injections, so as to allow valley regions of a curve indicative of a frequency characteristic of a combustion pressure wave generated by the multiple combustions to fall within respective ranges of a plurality of resonant frequency bands of a structure of an engine body of the engine; and a step of increasing a fuel injection amount of the pre-injection more largely as an engine load becomes lower at the same engine speed.

In the fuel injection control method of the present invention having this feature, the interval between the pre-injection and the main injection in the multiple fuel injections is controlled to allow valley regions of a curve indicative of a frequency characteristic of a combustion pressure wave generated by the multiple combustions to fall within respective ranges of a plurality of resonant frequency bands of the structure of the engine body, so that respective knocking sound components corresponding to the plurality of resonant frequency bands of the structure of the engine body can be adequately reduced. Further, the fuel injection amount of the pre-injection is increased more largely as the engine load becomes lower at the same engine speed, i.e., fuel ignitability becomes worse, so that it becomes possible to prevent a heat release interval between the pre-injection and the main injection from being reduced due to badness in the fuel ignitability, and thus adequately reduce respective knocking sound components corresponding to the plurality of resonant frequency bands of the structure of the engine body, in a broad range of ignition environments. In this method, a level of the entirety of the combustion pressure wave is not substantially changed, so that there is no risk of causing deterioration in fuel economy and exhaust emissions. Further, it is not necessary to additionally provide a sound insulator or the like, so that there is no risk of causing increases in cost and weight of the engine.

The term "frequency characteristic of a combustion pressure wave" herein is equivalent to a frequency characteristic of an in-cylinder pressure level (CPL) depending on combustion in the engine.

Preferably, the fuel injection control method of the present invention further comprises a step of: setting an injection timing of the main injection to a timing corresponding to a given crank angle; setting an injection timing of the pre-injection and optionally an injection timing of an after-injection in the multiple fuel injections, based on the set fuel injection interval; and controlling a fuel injection unit to perform, at the set injection timings, the pre-injection, the main injection and optionally the after-injection, respectively.

In the fuel injection control method having this feature, the injection timing of the pre-injection and optionally the injection timing of the after-injection are set, based on the set fuel injection interval and by using, as a reference point, the set injection timing of the main injection, so that a heat release interval can be controlled to allow valley regions of a curve indicative of a frequency characteristic of a combustion pressure wave generated by a combination of the pre-injection and the main injection and optionally a combination of the main injection and the after-injection to fall within respective ranges of the plurality of resonant frequency bands of the structure of the engine body, and thus adequately reduce respective knocking sound components corresponding to the plurality of resonant frequency bands of the structure of the engine body.

According to a second aspect of the present invention, there is provided a fuel injection control device for a compression self-ignition engine configured to, during one combustion stroke, perform multiple fuel injections to induce multiple combustions in a cylinder. The fuel injection control device comprises a controller configured to set an interval between a pre-injection and a main injection in the multiple fuel injections, so as to allow valley regions of a curve indicative of a frequency characteristic of a combustion pressure wave generated by the multiple combustions to fall within respective ranges of a plurality of resonant frequency bands of a structure of an engine body of the engine, wherein the controller is operable to increase a fuel injection amount of the pre-injection more largely as an engine load becomes lower at the same engine speed.

In the fuel injection control device of the present invention having this feature, the interval between the pre-injection and the main injection is controlled to allow valley regions of a curve indicative of a frequency characteristic of a combustion pressure wave generated by the multiple combustions to fall within respective ranges of a plurality of resonant frequency bands of the structure of the engine body, so that respective knocking sound components corresponding to the plurality of resonant frequency bands of the structure of the engine body can be adequately reduced. Further, the fuel injection amount of the pre-injection is increased more largely as the engine load becomes lower at the same engine speed, i.e., fuel ignitability becomes worse, so that it becomes possible to prevent a heat release interval between the pre-injection and the main injection from being reduced due to badness in the fuel ignitability, and thus adequately reduce respective knocking sound components corresponding to the plurality of resonant frequency bands of the structure of the engine body, in a broad range of ignition environments.

Preferably, in the fuel injection control device of the present invention, the controller is operable to increase the interval between the pre-injection and the main injection more largely as the engine load becomes lower at the same engine speed.

In the fuel injection control device having this feature, the interval between the pre-injection and the main injection is increased more largely as the engine load becomes lower at the same engine speed, i.e., the fuel ignitability becomes worse, so that it becomes possible to prevent the heat release interval between the pre-injection and the main injection from being reduced due to badness in the ignitability, and thus adequately reduce respective knocking sound components corresponding to the plurality of resonant frequency bands of the structure of the engine body, in a broad range of ignition environments.

Preferably, in the above fuel injection control device, the controller is operable to fix an injection timing of the main injection, and advance an injection timing of the pre-injection more largely as the engine load becomes lower at the same engine speed.

In the fuel injection control device having this feature, the injection timing of the main injection is fixed, and the injection timing of the pre-injection is advanced more largely as the engine load becomes lower, i.e., the fuel ignitability becomes worse, so that it becomes possible to prevent the heat release interval between the pre-injection and the main injection from being reduced due to badness in the ignitability, while suppressing an influence on exhaust emission performance, fuel economy, output torque and others of the engine, and thus adequately reduce respective knocking sound components corresponding to the plurality of resonant frequency bands of the structure of the engine body, in a broad range of ignition environments.

Preferably, in the above fuel injection control device, the controller is operable to retard an injection timing of the main injection more largely as the engine load becomes lower at the same engine speed.

In the fuel injection control device having this feature, the injection timing of the main injection is retarded more largely as the engine load becomes lower at the same engine speed, i.e., the fuel ignitability becomes worse, so that it becomes possible to prevent the heat release interval between the pre-injection and the main injection from being reduced due to badness in the ignitability, even in a situation where the injection timing of the pre-injection cannot be advanced, and thus adequately reduce respective knocking sound components corresponding to the plurality of resonant frequency bands of the structure of the engine body, in a broad range of ignition environments.

Preferably, in the above fuel injection control device, the multiple injections comprise the pre-injection, the main injection and an after-injection, wherein the controller is operable to, concurrently with retarding the injection timing of the main injection more largely as the engine load becomes lower at the same engine speed, retard an injection timing of the after-injection so as to maintain an interval between the main injection and the after-injection.

In the fuel injection control device having this feature, when the injection timing of the main injection is retarded more largely along with lowering of the engine load, the injection timing of the after-injection is retarded so as to maintain the interval between the main injection and the after-injection, so that, even when the injection timing of the main injection is retarded to prevent the heat release interval between the pre-injection and the main injection from being reduced due to badness in the fuel ignitability, the heat release interval can be controlled to allow frequencies in valley regions of a curve indicative of a frequency characteristic of a combustion pressure wave caused by the main injection and the after-injection to fall within respective ranges of the plurality of resonant frequency bands of the structure of the engine body, thereby adequately reducing respective knocking sound components corresponding to the plurality of resonant frequency bands of the structure of the engine body, in a broad range of ignition environments.

Preferably, in the fuel injection control device of the present invention, on an assumption that an engine operating state is divided into a high load region in which the engine load is relatively high, a medium load region in which the engine load is lower than that in the high load region, and a low load region in which the engine load is lower than that in the medium load region, the controller is operable, in the medium load region, to advance an injection timing of the pre-injection and increase the fuel injection amount of the pre-injection, with respect to those in the high load region, and, in the low load region, to increase the fuel injection amount of the pre-injection with respect to that in the medium load region, and retard an injection timing of the main injection with respect to that in each of the high load region and the medium load region.

In the fuel injection control device having this feature, the injection timing of the pre-injection is advanced to increase the interval between the pre-injection and the main injection more largely and the injection amount of the pre-injection is increased more largely, as the engine load becomes lower i.e., the fuel ignitability becomes worse, and, when the engine load becomes much lower i.e., the fuel ignitability becomes much worse, the fuel injection amount of the pre-injection is further increased to enhance the fuel ignitability, and the injection timing of the main injection is retarded to prevent the reduction in the heat release interval between the pre-injection and the main injection, so that it becomes possible to prevent the heat release interval between the pre-injection and the main injection from being reduced due to badness in the ignitability, while suppressing an influence on exhaust emission performance, fuel economy, output torque and others of the engine, and thus adequately reduce respective knocking sound components corresponding to the plurality of resonant frequency bands of the structure of the engine body, in a broader range of ignition environments.

Preferably, in the fuel injection control device of the present invention, the controller is operable to set an injection timing of the main injection to a timing corresponding to a given crank angle; set an injection timing of the pre-injection and optionally an injection timing of an after-injection in the multiple fuel injections, based on the set fuel injection interval; and control a fuel injection unit to perform, at the set injection timings, the pre-injection, the main injection and optionally the after-injection, respectively.

In the fuel injection control device having this feature, the injection timing of the pre-injection and optionally the injection timing of the after-injection are set, based on the set fuel injection interval and by using, as a reference point, the set injection timing of the main injection, so that a heat release interval can be controlled to allow valley regions of a curve indicative of a frequency characteristic of a combustion pressure wave generated by a combination of the pre-injection and the main injection and optionally a combination of the main injection and the after-injection to fall within respective ranges of the plurality of resonant frequency bands of the structure of the engine body, and thus adequately reduce respective knocking sound components corresponding to the plurality of resonant frequency bands of the structure of the engine body.

Effect of Invention

The compression self-ignition engine fuel injection control method and device of the present invention make it possible to adequately reduce a knocking sound corresponding to a resonant frequency of a structure of an engine body of the engine, in a broad range of ignition environments.

BRIEF DESCRIPTION OF DRAWINGS

FIG. 19 is a graph depicting a frequency characteristic of a vibration level of knocking sound.

DESCRIPTION OF EMBODIMENTS

With reference to the accompanying drawings, a compression self-ignition engine fuel injection control device according to one embodiment of the present invention will now be described.

<Overall Configuration>

Figure 1:
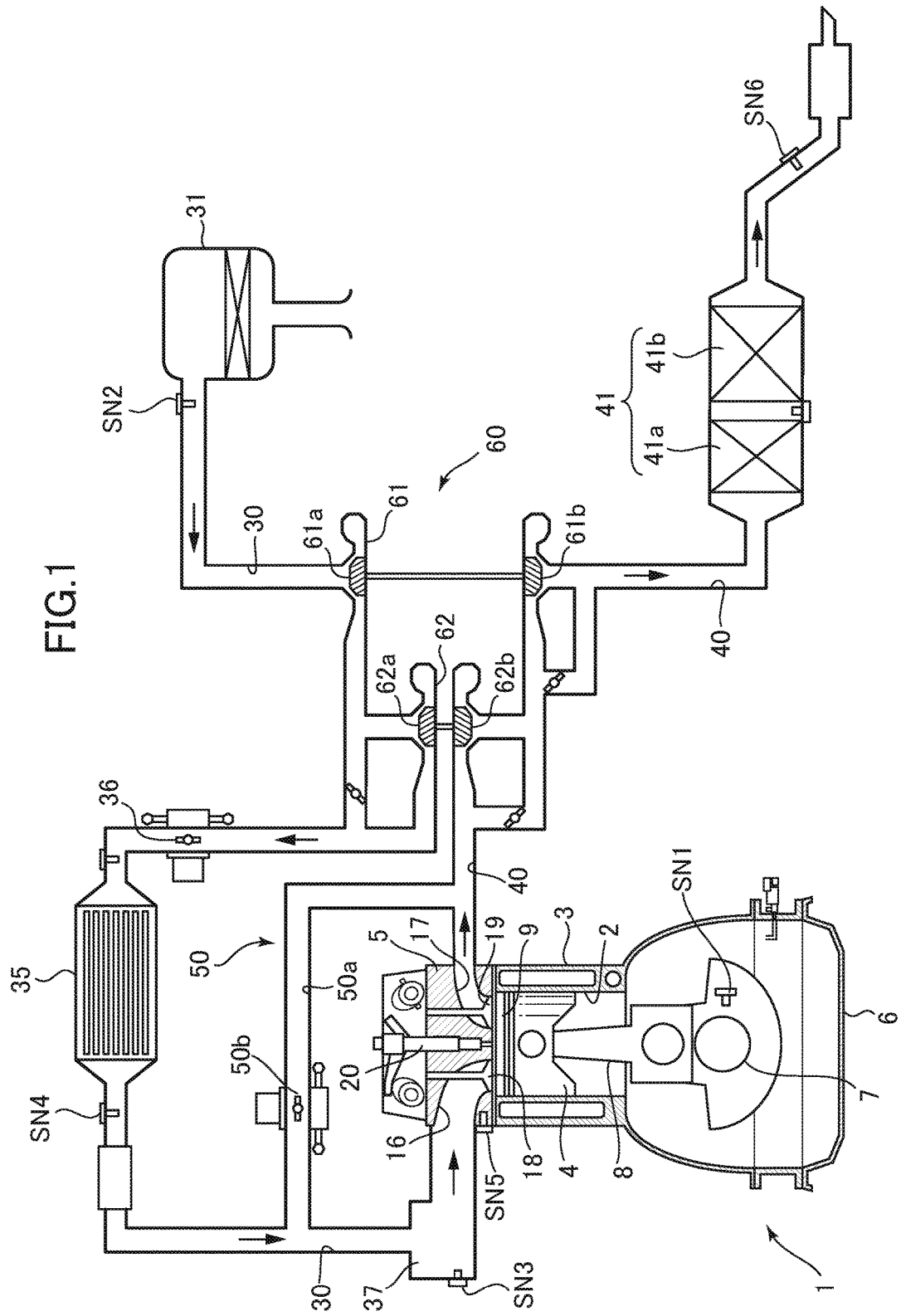
FIG. 1 is a schematic diagram depicting an overall configuration of a diesel engine employing a compression self-ignition engine fuel injection control device according to one embodiment of the present invention.

First of all, with reference to FIG. 1, a diesel engine employing the compression self-ignition engine fuel injection control device according to this embodiment will be described. FIG. 1 is a schematic diagram depicting the overall configuration of the diesel engine employing the compression self-ignition engine fuel injection control device according to this embodiment.

The diesel engine depicted in FIG. 1 is a four-stroke diesel engine to be mounted in a vehicle to serve as a traveling power source. Specifically, this diesel engine comprises: an engine body 1 having a plurality of cylinders 2 and configured to be driven while receiving a supply of fuel consisting mainly of light oil; an intake passage 30 for introducing combustion air to the engine body 1; an exhaust passage 40 for discharging exhaust gas produced in the engine body 1; an EGR device 50 for recirculating a part of exhaust gas passing through the exhaust passage 40 to the intake passage 30; and a turbocharger 60 configured to be driven by exhaust gas passing through the exhaust passage 40.

The intake passage 30 is provided with an air cleaner 31, two compressors 61a, 62a of the turbocharger 60, a throttle valve 36, an intercooler 35, and a surge tank 37, which are arranged in this order from an upstream side thereof. A portion of the intake passage 30 located downstream of the surge tank 37 is formed as a plurality of independent passages each communicating with a respective one of the cylinders 2. Thus, gas in the surge tank 37 is distributed to the respective cylinders 2 through the independent passages.

The exhaust passage 40 is provided with two turbines 62b, 61b of the turbocharger 60, and an exhaust gas purifying device 41, which are arranged in this order from an upstream side thereof.

The turbocharger 60 is constructed as a two-stage supercharging system capable of efficiently obtaining high supercharging in the entire engine speed range from a low engine speed range having low exhaust energy to a high engine speed range. More specifically, the turbocharger 60 comprises a large-size turbocharger 61 for supercharging a large amount of air in the high engine speed range, and a small-size turbocharger 62 capable of efficiently performing supercharging even by low exhaust energy, wherein the turbocharger 60 is configured to switch between a supercharging operation by the large-size turbocharger 61 and a supercharging operation by the small-size turbocharger 62, depending on an engine operating state (engine speed and load). In this turbocharger 60, the turbine 61b (62b) is rotated by receiving energy of exhaust gas flowing through the exhaust passage 40, and the compressor 61a (62a) is rotated interlockingly with the rotation to thereby compress (supercharge) air flowing through the intake passage 30.

The intercooler 35 is designed to cool air compressed by one or both of the compressors 61a, 62a.

The throttle valve 36 is designed to open and close the intake passage 30. In this embodiment, fundamentally, the throttle valve 36 is configured such that it is maintained in a fully open position or a highly opened position close to the fully open position during running of the engine, and is closed to shut the intake passage 30 only when needed, e.g., during shut-down of the engine.

The exhaust gas purifying device 41 is designed to purify harmful components contained in exhaust gas. In this embodiment, the exhaust gas purifying device 41 comprises an oxidation catalyst converter 41a for oxidizing CO and HC contained in exhaust gas, and a DPF 41b for capturing soot contained in exhaust gas.

The EGR device 50 is designed to recirculate a part of exhaust gas to an intake side. The EGR device 50 comprises: an EGR passage 50a connecting a portion of the exhaust passage 40 located upstream of the turbine 61b, 62b to a portion of the intake passage 30 located downstream of the intercooler 35; and an EGR valve 50b configured to open and close the EGR passage 50a, wherein the EGR device 50 is configured to recirculate, to the intake side, a part of relatively high-pressure exhaust gas (high-pressure EGR gas) discharged to the exhaust passage 40.

The engine body 1 comprises: a cylinder block 3 having the cylinders 2 each formed thereinside to extend in an up-down direction; a plurality of pistons 4 each received in a respective one of the cylinders 2 in a reciprocatingly movable (upwardly and downwardly movable) manner; a cylinder head 5 provided to cover edge faces (upper surfaces) of the cylinders 2 from a side opposed to crown surfaces of the pistons 4; and an oil pan 6 provided on an underside of the cylinder block 3 to store therein lubricating oil.

The piston 4 is coupled to a crankshaft 7 serving as an output shaft of the engine body 1, via a connecting rod 8. In each of the cylinders 2, a combustion chamber 9 is defined above the piston 4, to allow fuel injected from an aftermentioned injector 20 thereinto to be diffusively combusted while being mixed with air. Then, according to expansion energy arising from the combustion, the piston 4 is reciprocatingly moved to rotate the crankshaft 7 about an axis thereof. Each of the pistons 4 is provided with a dynamic vibration absorber for suppressing stretching resonance in the connecting rod 8. This dynamic vibration absorber will be described later.

In the diesel engine depicted in FIG. 1, a geometric compression ratio of the engine body 1, i.e., a ratio of a combustion chamber volume at a time when the piston 4 is located at bottom dead center to a combustion chamber volume at a time when the piston 4 is located at top dead center is set to 12 to 15 (e.g., 14). The valves "12 to 15" of geometric compression ratio are fairly low for diesel engines. This is intended to suppress a combustion temperature to thereby improve exhaust emission performance and thermal efficiency.

With respect to each of the cylinders 2, the cylinder head 5 is formed with an intake port 16 for introducing air supplied from the intake passage 30, to the combustion chamber 9, and an exhaust port 17 for introducing exhaust gas produced in the combustion chamber 9, to the exhaust passage 40, and provided with an intake valve 18 for opening and closing an opening of the intake port 16 on the side of the combustion chamber 9, and an exhaust valve 19 for opening and closing an opening of the exhaust port 17 on the side of the combustion chamber 9.

Further, with respect to each of the cylinders 2, the cylinder head 5 is provided with an injector 20 for injecting fuel into the combustion chamber 9. This injector 20 is attached in a posture where a distal end thereof on the side of the piston 4 faces a central region of a cavity (not depicted) which is a concaved portion provided on the crown surface of the piston 4. The injector 20 is connected to a fuel accumulator (not depicted) in a common rail fuel injection system via a fuel flow passage. High-pressure fuel pressurized by a fuel pump (not depicted) is stored in the fuel accumulator. The injector 20 is configured to receive a supply of fuel from the fuel accumulator and inject the fuel into the combustion chamber 9. Between the fuel pump and the fuel accumulator, a fuel pressure regulator (not depicted) is provided to adjust an internal pressure of the fuel accumulator, i.e., an injection pressure which is a pressure of fuel to be injected from the injector 20.

Figure 2:
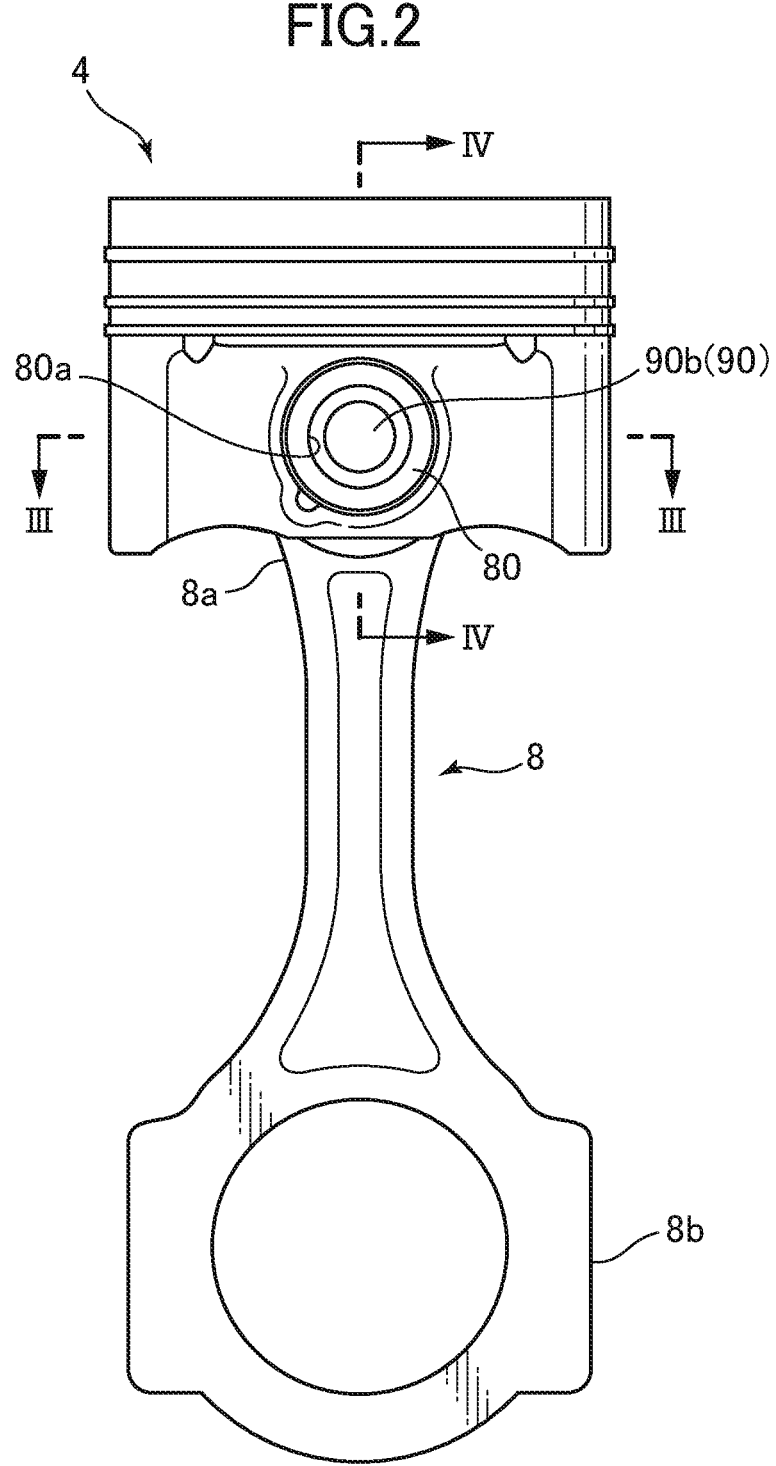
FIG. 2 is a diagram depicting a piston and a connecting rod of an engine body of the diesel engine according to the embodiment of the present invention.
Figure 3:
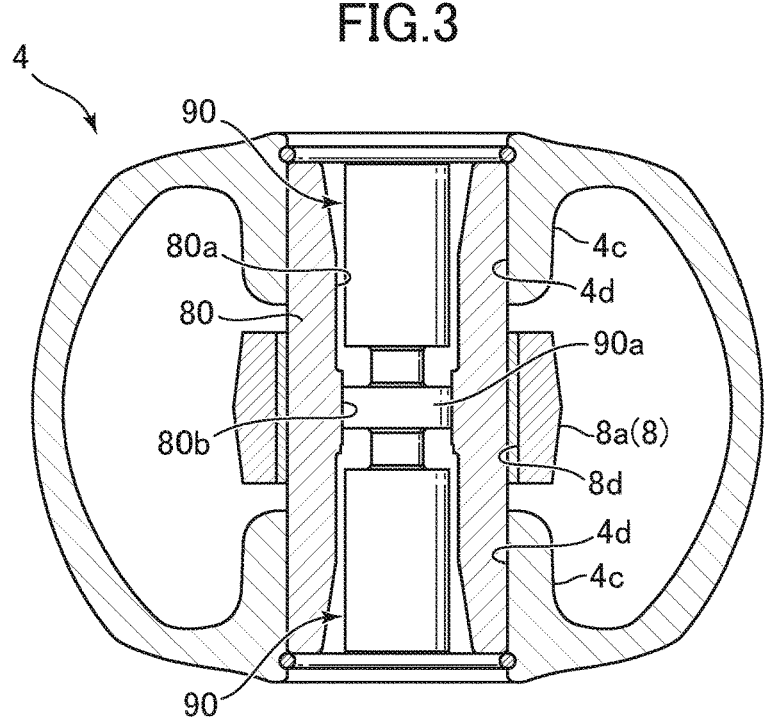
FIG. 3 is a sectional view taking along the line in FIG. 2.

Next, with reference to FIGS. 2 to 4, the dynamic vibration absorber will be described in detail. FIG. 2 is a diagram depicting the piston 4 and the connecting rod 8 of the engine body 1 of the diesel engine according to the embodiment of the present invention. FIG. 3 is a sectional view taking along the line in FIG. 2, and FIG. 4 is a sectional view taking along the line IV-IV in FIG. 2.

Figure 4:
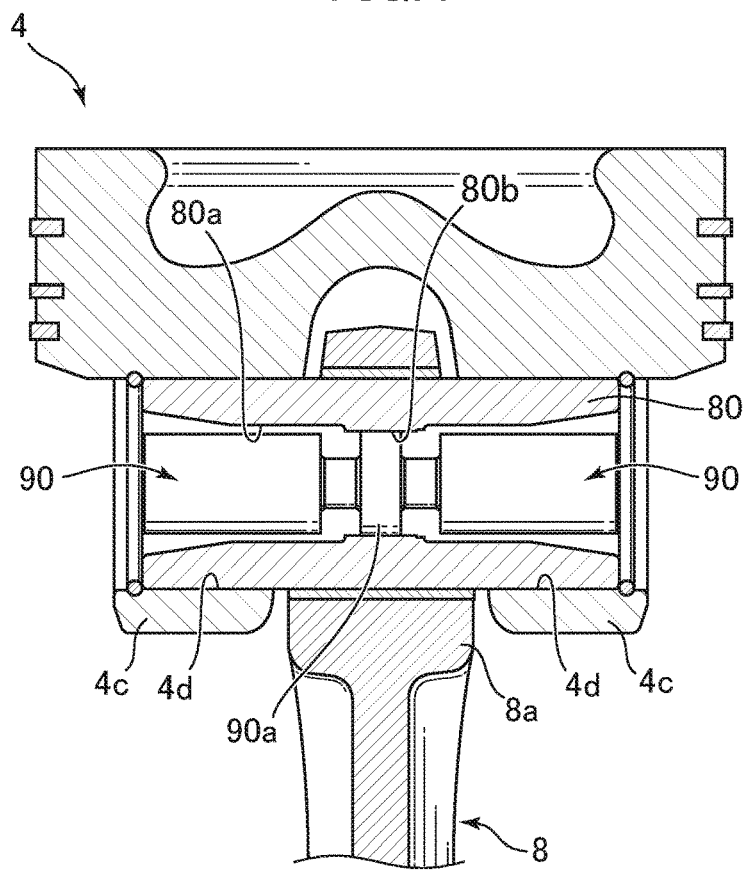
FIG. 4 is a sectional view taking along the line IV-IV in FIG. 2.

As depicted in FIGS. 3 and 4, a piston pin 80 has a cross-sectionally hollow structure. Specifically, a through-hole 80a is formed in a central region of the piston pin 80 to extend in an axial direction of the piston pin 80. A central region of an inner peripheral surface of the through-hole 80a in the axial direction of the piston pin 80 is formed as a press-fitting portion 80b onto which a fixing portion 90a of the dynamic vibration absorber 90 is press-fitted. An inner diameter of the press-fitting portion 80b of the through-hole 80a is set to be less than that of the remaining portion of the through-hole 80a.

Two dynamic vibration absorbers 90 for suppressing a phenomenon that, in a combustion stroke, the piston 4, the piston pin 80 and a small end 8a of the connecting rod 8 integrally resonate with respect to a big end 8b of the connecting rod 8, are provided within the piston pin 80 (in the through-hole 80a). The two absorbers 90 are located on respective ones of both sides of a plane passing through a midsection of the piston pin 80 in the axial direction thereof (i.e., a plane passing through the midsection and perpendicular to the axis of the piston pin 80).

In a combustion stroke, both of a lubricating oil film between the piston pin 80 and a pin insertion hole 8d of the connecting rod 8 (a spring coupling the piston pin 80 and the small end 8a of the connecting rod 8 together) and a lubrication oil film between the piston pin 80 and a pin support hole 4d of a boss 4c of the piston 4 vanish away, so that the piston pin 80 and the small end 8a of the connecting rod 8 are liable to integrally resonate with respect to the big end 8b. However, in this embodiment, the dynamic vibration absorber 90 provided in the piston pin 80 can suppress such a resonance, thereby reducing noise due to the resonance.

On the other hand, in an intake stroke, a compression stroke and an exhaust stroke, there are rubricating oil films, respectively, between the piston pin 80 and the pin insertion hole 8d of the connecting rod 8 and between the piston pin 80 and the pin support hole 4d of the boss 4c of the piston 4. As a result, a resonance which would conventionally occur is never generated. That is, the dynamic vibration absorber 90 is provided in the piston pin 80, so that, in an intake stroke, a compression stroke and an exhaust stroke, vibration transmission from the dynamic vibration absorber 90 to the connecting rod 8 can be suppressed by a lubricating oil film between the piston pin 80 and the pin insertion hole 8d of the connecting rod 8 (a spring coupling the piston pin 80 and the small end 8a of the connecting rod 8 together), to thereby prevent an increase in noise. In addition, the dynamic vibration absorber 90 is provided inside the piston pin 80, so that it becomes possible to effectively utilize space, and thus avoid an increase in size of the piston 4.

Figure 5:
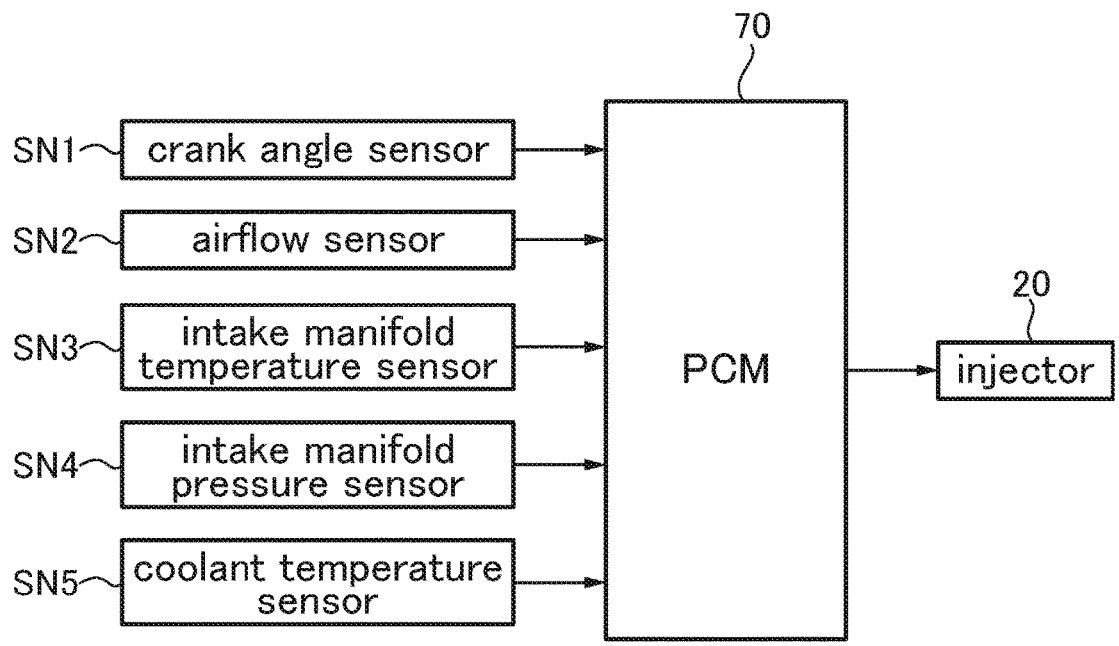
FIG. 5 is a block diagram depicting a control system of the diesel engine according to this embodiment.

Next, with reference to FIG. 5, a control system of the diesel engine according to this embodiment will be described. FIG. 5 is a block diagram depicting the diesel engine control system. As depicted in FIG. 5, the diesel engine according to the embodiment of the present invention is configured to be generally controlled by a PCM (Powertrain Control Module) 70. The PCM 70 is composed of a microprocessor comprising a CPU, a ROM and a RAM.

The PCM 70 is electrically connected to various sensors for detecting an engine operating state.

For example, the cylinder block 3 is provided with a crank angle sensor SN1 for detecting a rotational angle (crank angle) and a rotational speed of the crankshaft 7. This crank angle sensor SN1 is configured to output a pulse signal according to rotation of a crank plate (not depicted) rotated integrally with the crankshaft 7. Based on the pulse signal, the rotational angle of the crankshaft 7 and the rotational speed of the crankshaft 7 (i.e., engine speed) will be specified.

At a position adjacent to the air cleaner 31 (at a position between the air cleaner 31 and the compressor 61a), the intake passage 30 is provided with an airflow sensor SN2 for detecting an amount of air (fresh air) passing through the air cleaner 31, i.e., air to be taken into the cylinders 2.

The surge rank 37 is provided with an intake manifold temperature sensor SN3 for detecting a temperature of gas in surge rank 37, i.e., gas to be taken into the cylinders 2.

At a position downstream of the intercooler 35, the intake passage 30 is provided with an intake manifold pressure sensor SN4 for detecting a pressure of air passing through this position, i.e., air to be eventually taken into the cylinders 2.

The engine body 1 is provided with a coolant temperature sensor SN5 for detecting a temperature of coolant for cooling the engine body 1.

The PCM 70 is configured to control engine components while performing various determinations, calculations and others, based on input signals from the above various sensors. For example, the PCM 70 is operable to control the injector 20, the throttle valve 36, the EGR valve 50b, and the fuel pressure regulator. In this embodiment, the PCM 70 is configured to mainly control each of the injectors 20 to perform control concerning fuel to be supplied to a respective one of the cylinders 2 (fuel injection control). The PCM 70 is equivalent to "compression self-ignition engine fuel injection control device" set forth in the appended claims, and functions as "controller" set forth in the appended claims.

Figure 6:
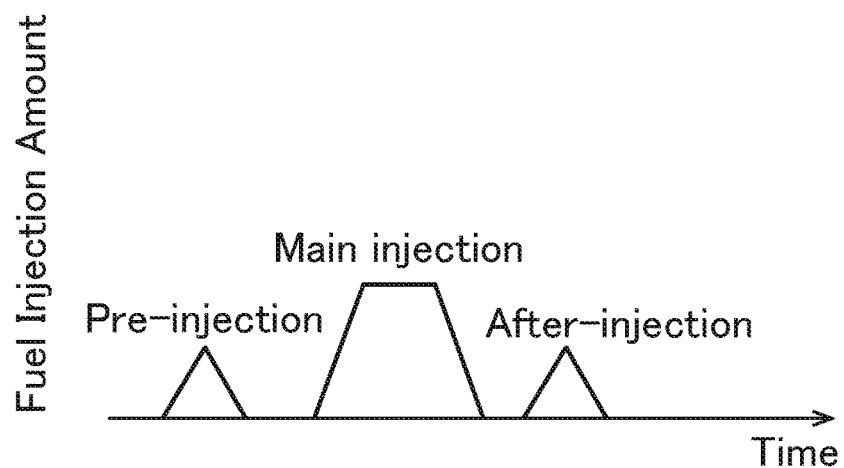
FIG. 6 is a time chart depicting a typical fuel injection pattern used in this embodiment.

Here, with reference to FIG. 6, a basic concept of the fuel injection control to be performed by the PCM 70 will be described. FIG. 6 is a time chart depicting a typical fuel injection pattern used in this embodiment. In this embodiment, as depicted in FIG. 6, the PCM 70 is operable to cause the injector 20 to perform a main injection for injecting fuel for producing an engine torque, into the combustion chamber 9 around the top dead center of a compression stroke (compression top dead center), and a pre-injection for injecting fuel into the combustion chamber 9 in an amount less than that in the main injection at a timing prior to the main injection, with a view to enhancing an air utilization rate or enhancing the ignitability in the main injection. In addition, the PCM 70 is operable to cause the injector 20 to perform an after-injection for injecting fuel into the combustion chamber 9 in an amount less than that in the main injection at a timing after the main injection, with a view to combusting soot produced in the combustion chamber 9. For example, the PCM 70 is operable to cause the injector 20 to perform the pre-injection and the after-injection in a pre-defined given engine operating range.

As to the main injection, the PCM 70 is operable, based on a demanded output depending on a position of an accelerator pedal operated by a driver, and an engine operating state, to set a basic injection timing of the main injection (hereinafter referred to as "reference main injection timing"). Further, in order to induce a combustion providing a relatively small heat release amount, by the pre-injection just before combustion of fuel injected by the main injection to thereby form a state in which the fuel injected by the main injection is more easily combusted, the PCM 70 is operable to set an injection timing of the pre-injection to a timing of allowing fuel mist injected by the pre-injection to be received within the cavity provided on the crown surface of the piston 4 and to form a relatively rich air-fuel mixture in the cavity. Furthermore, the PCM 70 is operable to set an injection timing of the pre-injection to a timing of allowing soot produced in the combustion chamber 9 by the fuel injections prior to the after-injection to be adequately combusted by the after-injection.

<Details of Control in this Embodiment>

Next, the fuel injection control to be executed by the PCM 70 so as to suppress knocking sound of the diesel engine will be more specifically described.

Figure 7:
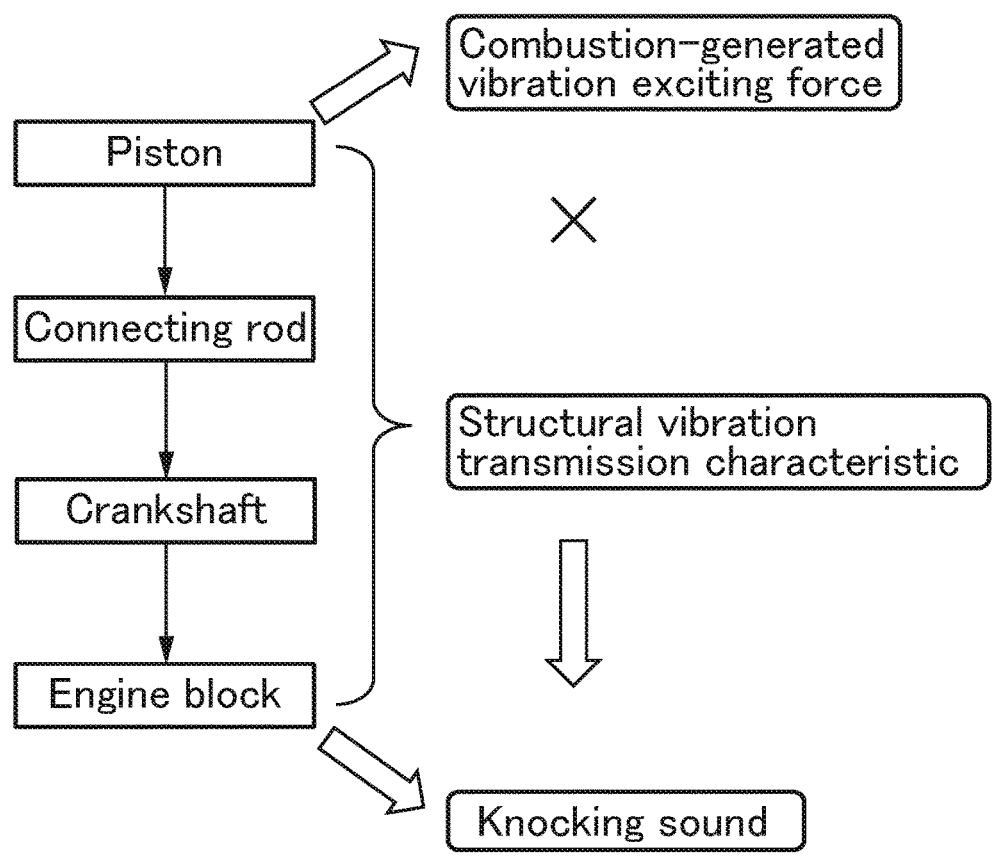
FIG. 7 is an explanatory diagram of a mechanism of generation of knocking sound.

First, with reference to FIGS. 7 and 8, a mechanism of generation of knocking sound will be described. As depicted in FIG. 7, vibration excited by a combustion-generated vibration exciting force, i.e., a vibration exciting force generated by combustion in an engine body, is transmitted via a main route comprising a piston, a connecting rod, a crankshaft and an engine block (such a main route has a given structural vibration transmission characteristic which depends on a resonant frequency of a structure (component assembly) of the engine body), and then radiated from the engine body as knocking sound.

Figure 8:
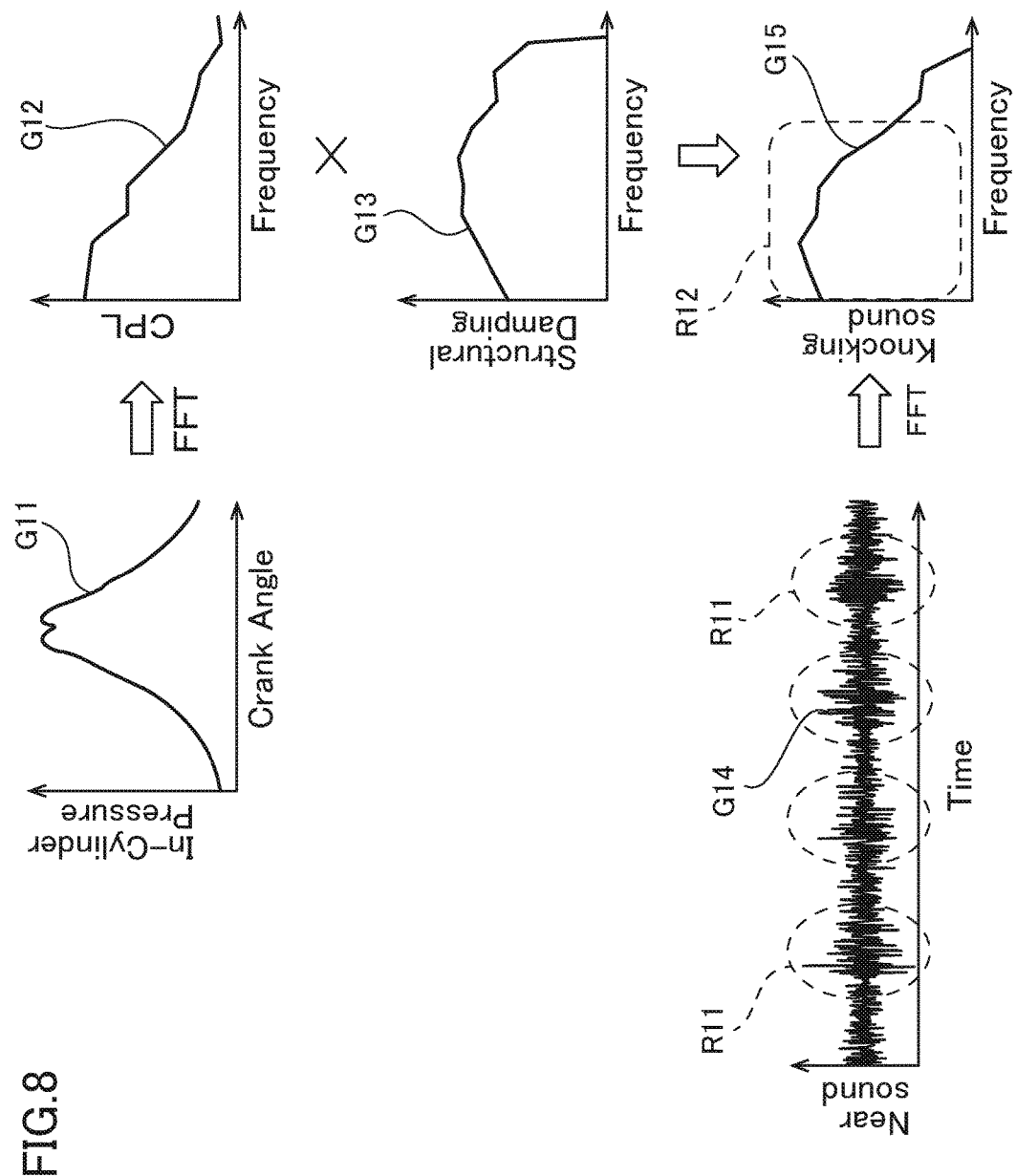
FIG. 8 is an explanatory diagram of a mechanism of generation of knocking sound.

In FIG. 8, the plot G11 represents a relationship between a crank angle and an in-cylinder pressure (combustion pressure), and the plot G12 represents a frequency characteristic of a CPL equivalent to the combustion-generated vibration exciting force, obtained by subjecting the in-cylinder pressure in the plot G11 to FFT (Fast Fourier Transform) processing (the CPL is high-frequency energy in a frequency range of about 1 to 4 kHz, derived by subjecting a waveform of the in-cylinder pressure as an index of the combustion-generated vibration excitation force to FFT (Fast Fourier Transform) processing. Further, the plot G13 represents the aforementioned structural vibration transmission characteristic (specifically, a structural vibration damping-frequency characteristic) of an engine body, and the plot G14 represents a waveform indicative of a temporal change in sound near the engine body. A characteristic obtainable by applying the structural vibration transmission characteristic represented by the plot G13 to the CPL-frequency characteristic represented by the plot G12 is approximately coincident with a characteristic obtainable by subjecting the waveform indicative of the temporal change in the near sound, represented by the plot G13, to FFT processing, and is expressed as a curve indicative of a characteristic of knocking sound (see the plot G15).

In the plot G14, a part of the waveform having a large fluctuation over time, such as the region R11 surrounded by the dashed line, is heard as knocking sound by a person. In the plot G15, a sum of energies in a frequency range of 1 to 4 kHz indicated by the region R12 surrounded by the dashed line, is used as a representative value of the knocking sound.

As mentioned above, knocking sound comes under an influence of a CPL-frequency characteristic. Thus, in this embodiment, a CPL-frequency characteristic is controlled to achieve reduction in knocking sound. Here, with reference to FIG. 9, a basic idea of a technique of reducing knocking sound by controlling a CPL-frequency characteristic in this embodiment will be described. The term "CPL-frequency characteristic" is equivalent to a frequency characteristic of a combustion pressure wave generated by combustion of fuel in the engine body.

Figure 9:
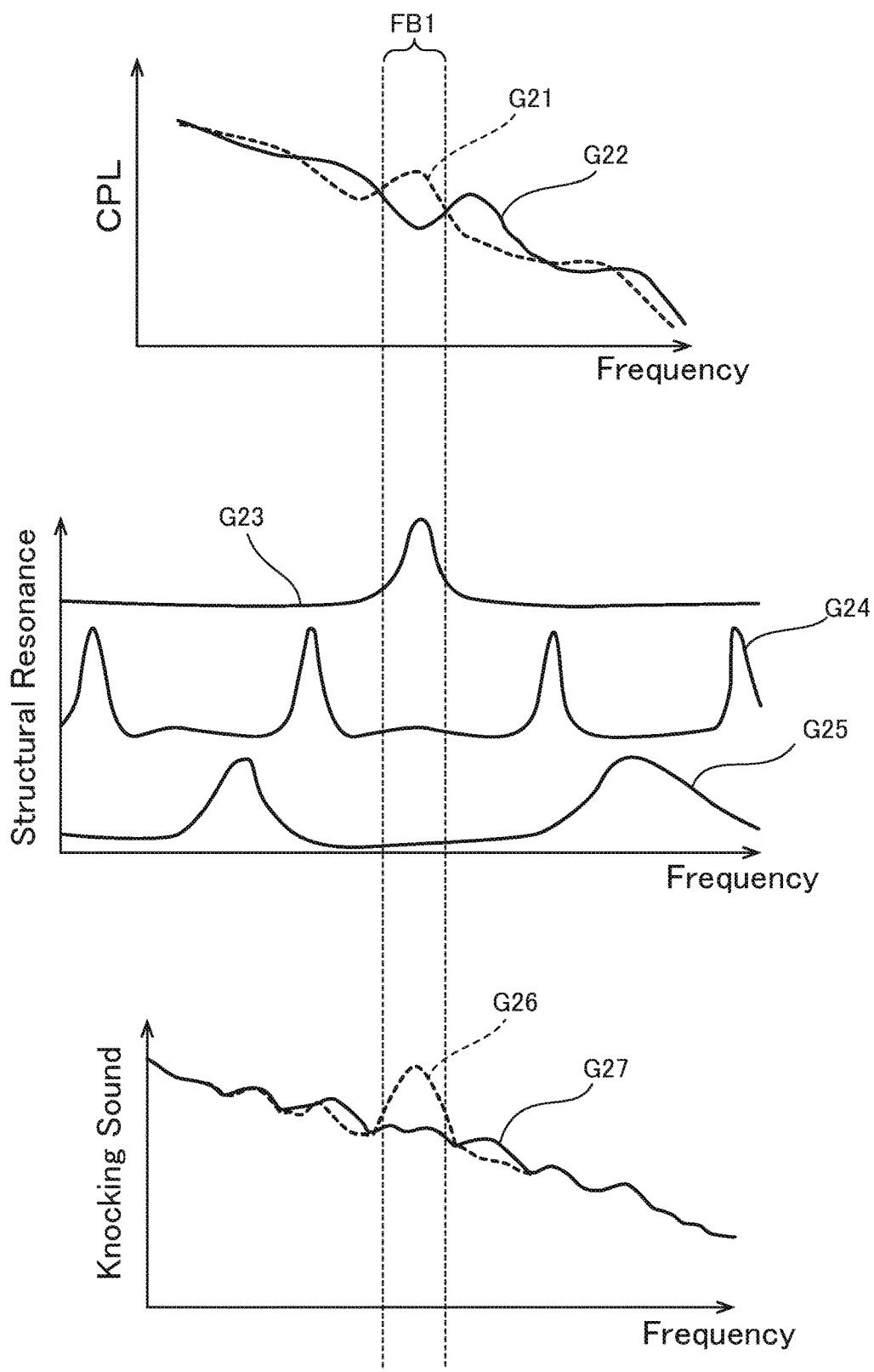
FIG. 9 is an explanatory diagram of a basic concept of a technique of reducing knocking sound by controlling a CPL-frequency characteristic in this embodiment.

In FIG. 9, the plot G21 represents a reference CPL-frequency characteristic (e.g., a CPL-frequency characteristic in the case where fuel injections are performed using a basic fuel injection timing set based on a demanded output depending on a position of an accelerator pedal operated by a driver, an engine operating state (engine speed and engine load), etc.), and the plots G23, G24 and G25 represent respective structural resonance-frequency characteristics of various components of an engine body. For example, the plot G23 represents a structural resonance-frequency characteristic of a connecting rod of the engine body, and the plot G24 represents a structural resonance-frequency characteristic of a crankshaft rod of the engine body. Further, the plot G25 represents a structural resonance-frequency characteristic of the engine block. Here, suppose that the structural resonance represented by the plot G23 has a larger influence on knocking sound, than those of the structural resonances represented by the plots G24 and G25. In this case, from the CPL-frequency characteristic represented by the plot G21 and the structural resonances of the components of the engine body represented by the plots G 23 to G25, a knocking sound having a frequency characteristic represented by the plot G26 is generated. The plot G26 shows that knocking sound becomes larger in a frequency band FB1. Specifically, in the frequency band FB1, a large peak occurs in a curve indicative of the knocking sound. This is probably because, in the frequency band FB1, a peak occurs in a curve indicative of the CPL in the plot G21, and a peak also occurs in a curve indicative of the structural resonance of the component of the engine body (having a large influence on knocking sound) in the plot G23.

In this embodiment, a CPL-frequency characteristic is controlled such that a valley region of a curve indicative of the CPL-frequency characteristic is located in the frequency band FB1 where a peak occurs in a curve indicative of the structural resonance of the component of the engine body (having a large influence on knocking sound) in the plot G23, i.e., the valley region of the curve indicative of the CPL-frequency characteristic is included in the frequency band FB1. Specifically, the control is performed to realize a CPL-frequency characteristic in which the valley region of the curve indicative of the CPL-frequency characteristic is included in the frequency band FB1, as represented by the plot G22. When the CPL-frequency characteristic represented by the plot G22 is applied, knocking sound will be significantly reduced in the frequency band FB1, as represented by the plot G27. In this case, a level of the entirety of the CPL is never changed, so that it becomes possible to adequately reduce knocking sound while ensuring a demanded engine output, without causing deterioration in fuel economy and exhaust emissions.

Next, with reference to FIGS. 10 to 13, a technique of controlling a CPL-frequency characteristic to be changed to a desired characteristic (e.g., the frequency characteristic as represented by the plot G22), in this embodiment, will be described.

Figure 10A:
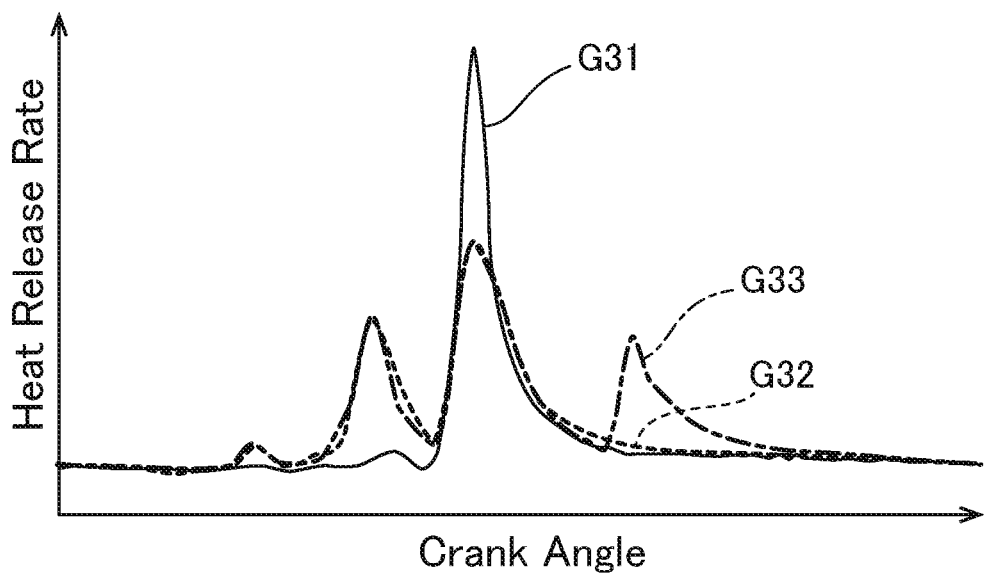
FIGS. 10A and 10B are explanatory diagrams of an influence of the number of times of fuel injection (the number of times of heat release to be generated in the engine body) on a CPL-frequency characteristic.
Figure 10B:
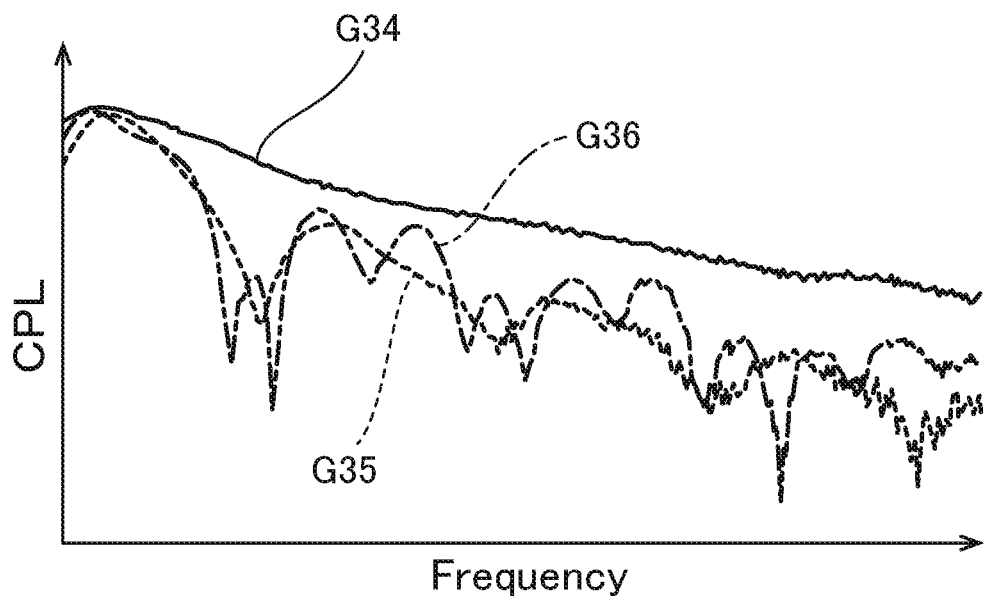

FIGS. 10A and 10B are explanatory diagrams of an influence of the number of times of fuel injection (the number of times of heat release to be generated in the engine body) on a CPL-frequency characteristic. In FIG. 10A, the plot G31 represents a waveform of a heat release rate with respect to the crank angle in the case where fuel injection is performed only once (e.g., in the case where only the main injection is performed). The plot G32 represents a waveform of the heat release rate with respect to the crank angle in the case where fuel injection is performed twice (e.g., in the case where the pre-injection and the main injection are performed), and the plot G33 represents a waveform of the heat release rate with respect to the crank angle in the case where fuel injection is performed three times (e.g., in the case where the pre-injection, the main injection and the after-injection are performed).

In the case where fuel injection is performed only once, a frequency characteristic is obtained in which the CPL becomes gradually lower along with an increase in frequency, as represented by the plot G34 in FIG. 10B. In this case, it can be seen that neither a peak nor a valley appears in a curve indicative of a CPL-frequency characteristic. On the other hand, in the case where fuel injection is performed twice or three times, a peak and a valley occur in the curve indicative of the CPL-frequency characteristic, as represented by the plot G35 or G36 in FIG. 10B. This data shows that, when fuel injection is performed two or more times, i.e., combustion (heat release) is induced two or more times in the engine body, a peak and a valley occur in the curve indicative of the CPL-frequency characteristic. Further, the plots G35 and G36 show that, when fuel injection is performed three times, the member of peaks and valleys in the curve indicative of the CPL-frequency characteristic increases as compared to when fuel injection is performed twice.

Figure 11A:
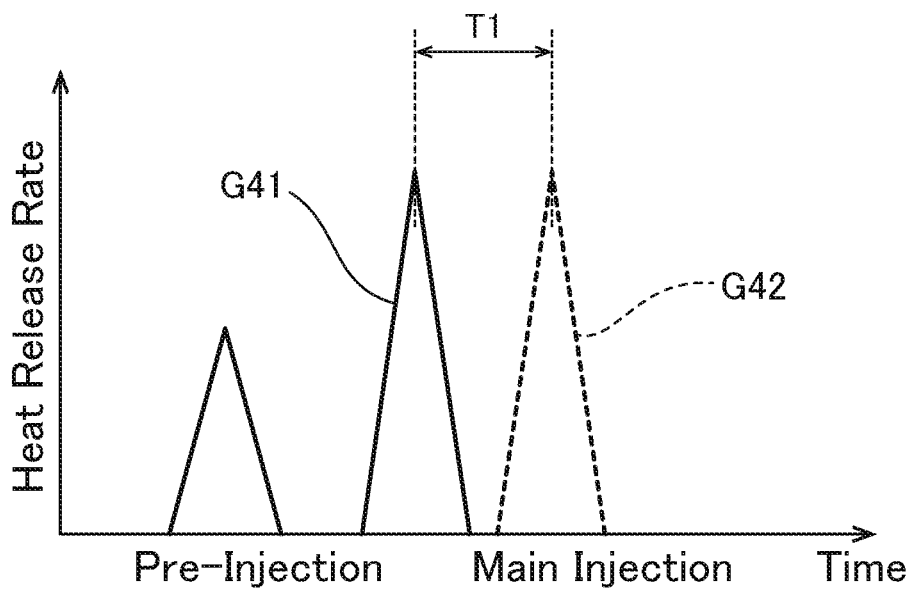
FIGS. 11A and 11B are explanatory diagrams of an influence of fuel injection timings (timings of causing heat release) of multiple (two or more) fuel injections on a CPL-frequency characteristic.
Figure 11B:
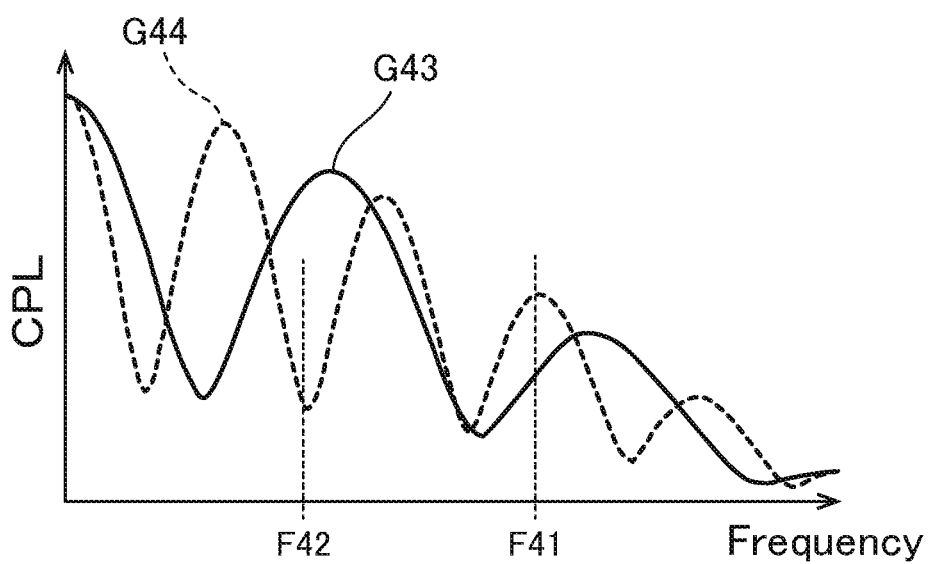

FIGS. 11A and 11B are explanatory diagrams of an influence of fuel injection timings (timings of causing heat release) in the case where combustion is induced two or more times, on a CPL-frequency characteristic. Here, a result of a simulation (not a result of an actual experiment) will be described which was conducted under a condition that, when two fuel injections (pre-injection and main injection) are performed, a timing of the first-stage, pre-injection is fixed, and a timing of the second-stage, main-injection is changed.

In FIGS. 11A and 11B, the plot G41 represents a heat release rate in the case where a pre-changed fuel injection timing (reference main injection timing) is applied to the main injection, and the plot G43 is a CPL-frequency characteristic simulated based on the heat release rate represented by the plot G41. On the other hand, the plot G42 represents a heat release rate in the case where the fuel injection timing of the main injection is changed (specifically, delayed) from the reference main injection timing. Specifically, in terms of a timing at which a peak value (maximum value) of the heat release rate appears as a result of the main injection, the plot G42 is delayed with respect to the plot G41 by time T1 (e.g., 0.5 msec). Based on the heat release rate represented by the plot G41, the CPL-frequency characteristic represented by the plot G44 is obtained.

The plots G43 and G44 show that, in the case where fuel injection is performed twice, i.e., combustion (heat release) is induced twice, the CPL-frequency characteristic is changed by changing a timing of causing heat release. Specifically, they show that the number of peaks and valleys in a curve indicative of the CPL is changed, and frequencies corresponding to respective positions of the peaks and the valleys in the curve indicative of the CPL are changed. Thus, the timing of causing heat release, particularly, an interval at which respective peak values of the heat release rate pertaining to the two combustions appear (hereinafter be appropriately referred to as "heat release interval") is considered to exert an influence on frequencies corresponding to respective positions of the peaks and the valleys in the curve indicative of the CPL.

Figure 12A:
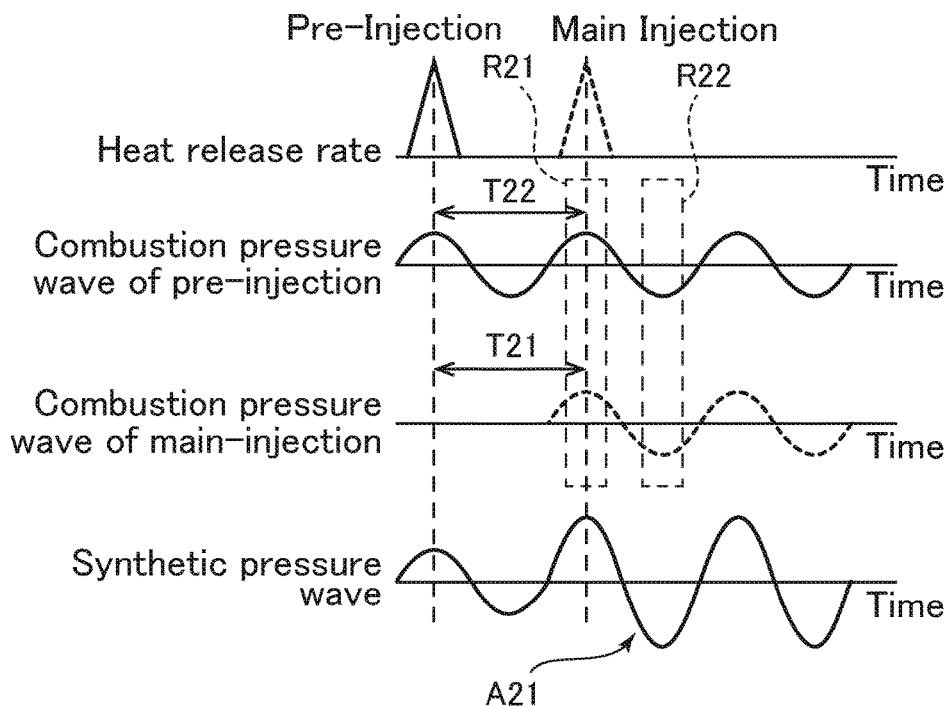
FIGS. 12A and 12B are explanatory diagrams of a mechanism of generation of a peak and a valley in a curve indicative of a CPL-frequency characteristic.
Figure 12B:
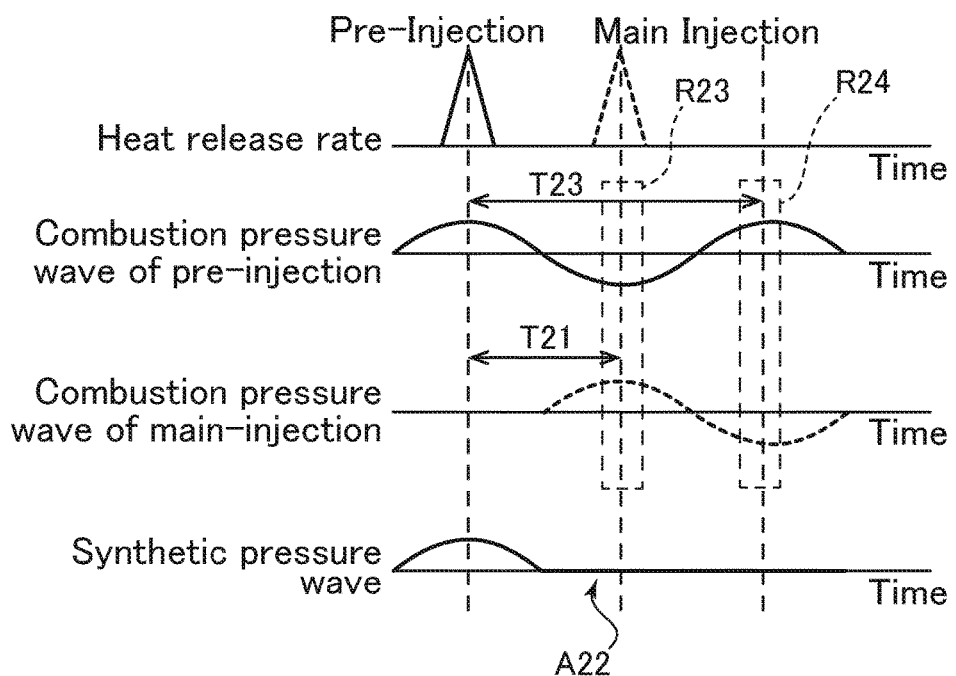

FIGS. 12A and 12B are explanatory diagrams of a mechanism of generation of a peak and a valley in a curve indicative of the CPL. FIG. 12A depicts a temporal change in a combustion pressure wave caused by the pre-injection, a temporal change in a combustion pressure wave caused by the main-injection, and a temporal change in a synthetic pressure wave obtained by synthesizing the two combustion pressure waves together, at a frequency F41 corresponding to a peak in the curve indicative of the CPL in the plot G44 depicted in FIG. 11B. In this case, assume that an interval at which two peak values appear in a waveform indicative of the heat release rate in connection with respective ones of the pre-injection and the main injection (heat release interval) is T21 (this will also be applied to the following). Further, assume that a period T22 (=1/F41×1000) of the combustion pressure waves caused by the pre-injection and the main injection is approximately identical to the heat release interval T21.

At the frequency F41, a generation timing of the combustion pressure wave caused by the main injection is approximately coincident with a timing corresponding to the period T21 of the combustion pressure wave caused by the pre-injection, so that the combustion pressure wave caused by the pre-injection and the combustion pressure wave caused by the main injection interfere with each other in the same phase. Thus, a peak region of the combustion pressure wave caused by the pre-injection and a peak region of the combustion pressure wave caused by the main injection overlap each other (see the region R21 surrounded by the dashed line), and a valley region of the combustion pressure wave caused by the pre-injection and a valley region of the combustion pressure wave caused by the main injection overlap each other (see the region R22 surrounded by the dashed line). For this reason, the combustion pressure wave caused by the pre-injection and the combustion pressure wave caused by the main injection are synthesized together to form a synthetic pressure wave in an amplified manner (see the curve designated by the arrowed line A21). As a result, a peak appears in the curve indicative of the CPL at the frequency F41, as represented by the plot G44 in FIG. 11B.

On the other hand, FIG. 12B depicts a temporal change in a combustion pressure wave caused by the pre-injection, a temporal change in a combustion pressure wave caused by the main-injection, and a temporal change in a synthetic pressure wave obtained by synthesizing the two combustion pressure waves together, at a frequency F42 corresponding to a valley in the curve indicative of the CPL in the plot G44 depicted in FIG. 11B. Assume that a period T23 (=1/F42×1000) of the combustion pressure waves caused by the pre-injection and the main injection is equal to approximately two times the heat release interval T21.

At the frequency F42, the combustion pressure wave caused by the main injection is generated at a timing corresponding to approximately a midpoint of the period T23 of the combustion pressure wave caused by the pre-injection, so that the combustion pressure wave caused by the pre-injection and the combustion pressure wave caused by the main injection interfere with each other in opposite phases. Thus, a valley region of the combustion pressure wave caused by the pre-injection and a peak region of the combustion pressure wave caused by the main injection overlap each other (see the region R23 surrounded by the dashed line), and a peak region of the combustion pressure wave caused by the pre-injection and a valley region of the combustion pressure wave caused by the main injection overlap each other (see the region R24 surrounded by the dashed line). For this reason, the combustion pressure wave caused by the pre-injection and the combustion pressure wave caused by the main injection are synthesized together to form a synthetic pressure wave in an attenuated manner (see the curve designated by the arrowed line A22). As a result, a valley appears in the curve indicative of the CPL at the frequency F42, as represented by the plot G44 in FIG. 11B.

In this case, a relationship between the heat release interval and positions at which a peak and a valley occur in the CPL-frequency characteristic can be expressed by the following formulas (1) and (2):

Frequency $fn$ at which a peak occurs $=n/\Delta t \times 1000$   (1)

Frequency $fn$ at which a valley occurs $=(n-0.5)/\Delta t \times 1000$   (2)

, where $\Delta t$ denotes the heat release interval, and n denotes a positive integer (1, 2, 3, - - - ).

Although a result obtained by performing two fuel injections (pre-injection and main injection) has been presented in FIGS. 11A and 11B, it has also been ascertained that a similar result can be obtained in the case where three fuel injections (pre-injection, main injection and after-injection) are performed. Specifically, it was found that, in the case where three fuel injections are performed, frequencies corresponding to respective positions of frequencies corresponding to respective positions of peaks and valleys in a curve indicative of the CPL are changed depending on an interval at which respective peak values of the heat release rate pertaining to adjacent two of three combustions (heat release interval) appear. Further, although a result of a simulation using a given model (such as a combustion model) has been presented in FIGS. 11A and 11B, it has been ascertained that such a result can also be obtained by an experiment using an actual engine. In the above description, by changing a heat release interval during multiple fuel injections, the influence of the heat release interval on the CPL-frequency characteristic has been checked. In addition to the heat release interval, the inventors have also checked an influence of a height and slope of a waveform of the heat release rate on the CPL-frequency characteristic by changing the height and slope. As a result, it was found that, even when the height and slope of the waveform of the heat release rate are changed, only the amplitude of the CPL is changed, but the number of peaks and valleys in the curve indicative of the CPL and frequencies at the peaks and valleys are almost not changed.

From the above, it was found that the heat release interval during multiple fuel injections exerts an influence on the CPL-frequency characteristic. In response to such a result, in this embodiment, the heat release interval during multiple fuel injections is controlled to allow the CPL-frequency characteristic to become a desired characteristic (e.g., the frequency characteristic presented by the plot G22). Specifically, in this embodiment, the PCM 70 is operable to set an interval between adjacent two of multiple fuel injections so as to realize a heat release interval for enabling the CPL-frequency characteristic to become a desired characteristic. More specifically, the PCM 70 is operable, in order to realize a CPL-frequency characteristic in which valley regions of a curve indicative thereof fall within respective ranges of a plurality of resonant frequency bands of a structure of the engine body (see, for example, FIG. 9), to set an interval between adjacent two of multiple fuel injections, based on a heat release interval for obtaining the above CPL-frequency characteristic.

Figure 13:
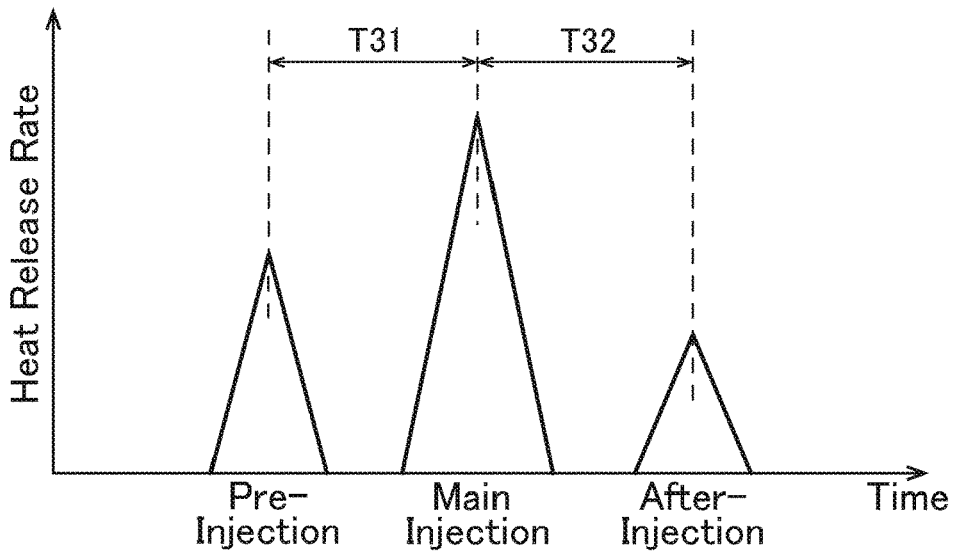
FIG. 13 is an explanatory diagram of a basic concept of a control method for a heat release interval, in this embodiment.

FIG. 13 is an explanatory diagram of a basic concept of a control method for a heat release interval, in this embodiment. FIG. 13 schematically depicts a heat release rate pertaining to the pre-injection, a heat release rate pertaining to the main injection, and a heat release rate pertaining to the after-injection, which appear in this order from the right side of the graph. In this embodiment, the PCM 70 is operable to set intervals at which the pre-injection, the main injection and the after-injection are performed individually, in such a manner that a heat release interval T31 between the pre-injection and the main injection and a heat release interval T32 between the main injection and the after-injection are realized so as to enable a CPL-frequency characteristic to become a desired characteristic. Then, the PCM 70 is operable to control the injector 20 to perform the pre-injection, the main injection and the after-injection at respective fuel injection timings according to the set intervals.

Next, with reference to FIGS. 14 to 18, a specific processing of fuel injection control to be executed by the PCM 70 will be described.

Figure 14:
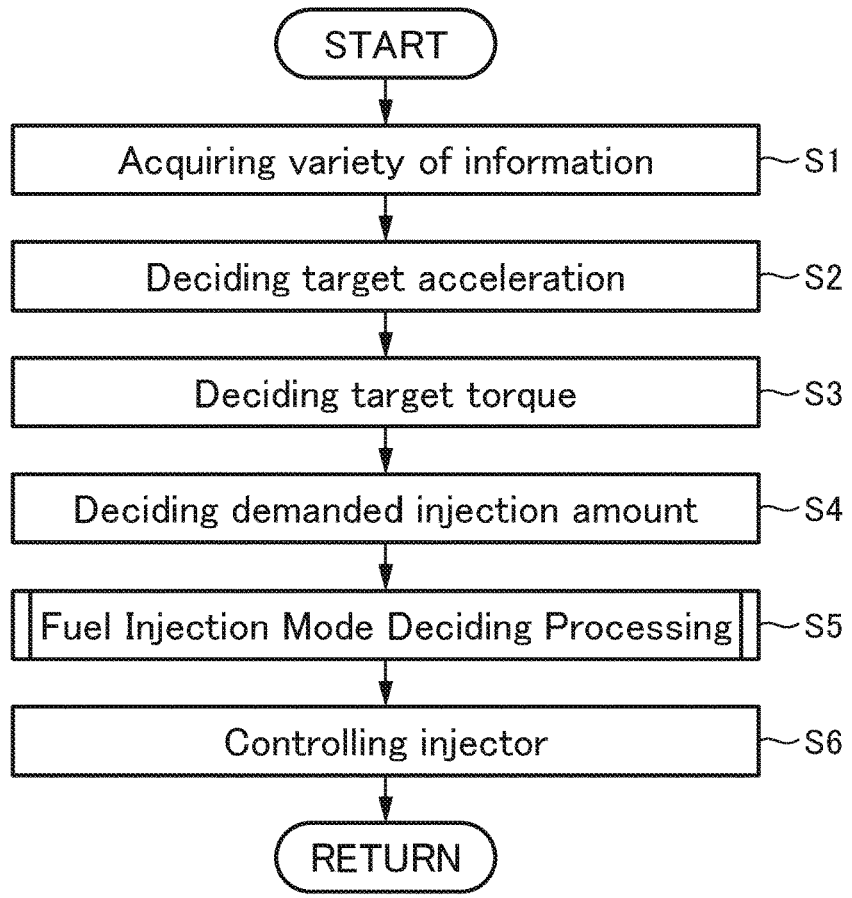
FIG. 14 is a flow chart of a fuel injection control processing to be executed by a PCM of the diesel engine according to this embodiment.

FIG. 14 is a flow chart of a fuel injection control processing to be executed by the PCM 70. This fuel injection control processing is activated when an ignition switch of a vehicle is turned on and thus the PCM 70 is powered on, and repeatedly executed.

Upon start of the fuel injection control processing, as depicted in FIG. 14, in step S1, the PCM 70 operates to acquire a variety of information about a vehicle running state. Specifically, the PCM 70 operates to acquire information including an accelerator position detected by an accelerator position sensor, a vehicle speed detected by a vehicle speed sensor, and a gear stage currently set in a transmission of the vehicle, in addition to detection signals output from the aforementioned various sensors SN1 to SN5.

Subsequently, in step S2, the PCM 70 operates to set a target acceleration, based on the information acquired in the step S1. Specifically, the PCM 70 operates to select an acceleration characteristic map corresponding to a current vehicle speed and a current gear stage, among a plurality of acceleration characteristic maps (which are preliminarily created and stored in a memory or the like) defined with respect to various vehicle speeds and various gear stages, and decide a target acceleration corresponding to a current accelerator position by referring to the selected acceleration characteristic map.

Subsequently, in step S3, the PCM 70 operates to decide a target torque (target engine torque) for realizing the target acceleration decided in the strep S2. Specifically, the PCM 70 operates to decide a target torque within a torque range outputtable from the engine, based on current vehicle speed, gear stage, road grade, road surface mu ($\mu$), etc.

Subsequently, in step S4, the PCM 70 operates to set a demanded fuel injection amount (specifically, a demanded fuel injection amount of the main injection) to be injected from the injector 20 to obtain the target torque, based on the target torque decided in the step S3, and an engine speed derived based on an output signal from the crank angle sensor SN1.

Subsequently, in step S5, the PCM 70 operates to execute a fuel injection mode deciding processing for deciding a fuel injection mode (specifically, a fuel injection amount and fuel injection timing). Details of the fuel injection mode deciding processing will be described later.

After completion of the processing in the step S5, the PCM 70 operates to control the injector 20, based on the demanded fuel injection amount decided in the step S4, and the fuel injection mode decided in the step S5. After the step S6, the fuel injection control processing returns to the step S1.

Figure 15:
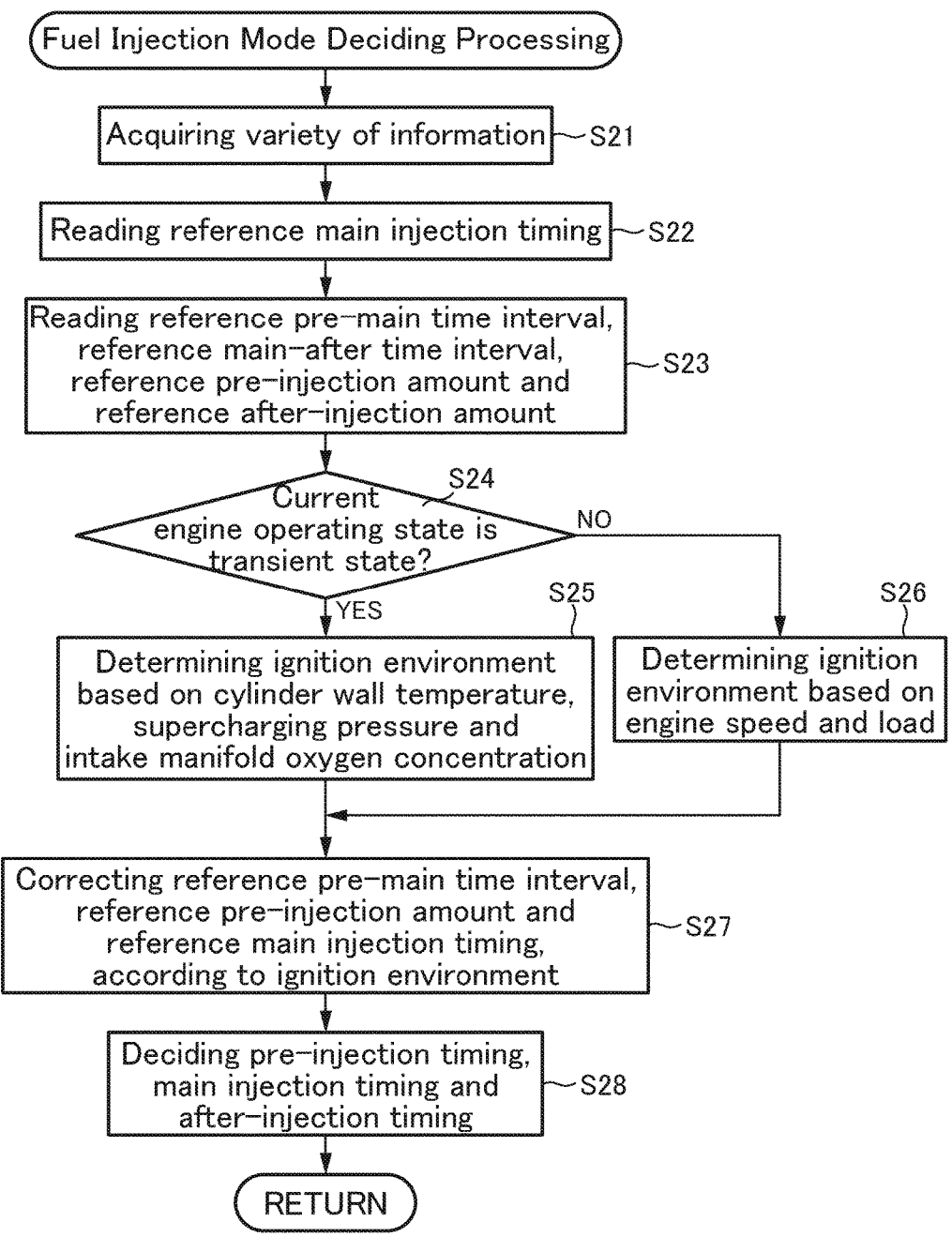
FIG. 15 is a flowchart of a fuel injection mode deciding processing for deciding a fuel injection mode by the fuel injection control device according to this embodiment.
Figure 16:
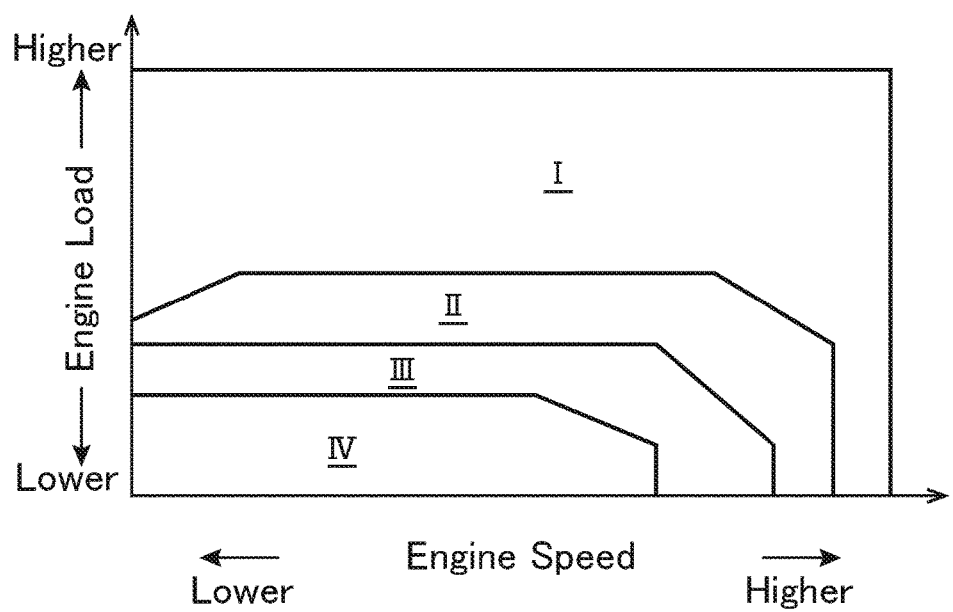
FIG. 16 is a map to be referred to by the fuel injection control device according to this embodiment during determination of an ignition environment based on an engine operating state.

Here, with reference to FIG. 15, the fuel injection mode deciding processing to be executed in the step S5 of the fuel injection control processing.

Upon start of the fuel injection mode deciding processing, as depicted in FIG. 15, in step S21, the PCM 70 operates to acquire a variety of information about an engine operating state. Specifically, the PCM 70 operates to acquire information including a supercharging pressure, an estimated cylinder wall temperature value, an intake manifold oxygen concentration, the target torque decided in the step S3 of the fuel injection control processing, etc., in addition to detection signals output from the aforementioned various sensors SN1 to SN5.

Subsequently, in step S22, the PCM 70 operates to read a reference main injection timing, based on the information acquired in the step S21. Specifically, the PCM 70 operates to read a reference main injection timing corresponding to the target torque and a current engine speed acquired in the step S21, by referring to a map in which a reference main injection timing corresponding to a given crank angle is preliminarily set with respect to target torque and engine speed as parameters.

Subsequently, in step S23, the PCM 70 operates to read a basic time interval between a fuel injection end timing of the pre-injection and a fuel injection start timing of the main injection (hereinafter referred to as "reference pre-main time interval"), a basic time interval between a fuel injection end timing of the main injection and a fuel injection start timing of the after-injection (hereinafter referred to as "reference main-after time interval"), a basic fuel injection amount of the pre-injection (hereinafter referred to as "reference pre-injection amount"), and a basic fuel injection amount of the after-injection (hereinafter referred to as "reference after-injection amount").

The reference pre-main time interval and the reference main-after time interval are preliminarily set to allow valley regions of a curve indicative of a frequency characteristic of a resulting CPL to fall within respective ranges of the resonant frequency bands of the structure of the engine body, in an engine operating state allowing good fuel ignitability.

On the other hand, as to each of the reference pre-injection amount and the reference after-injection amount, basic values thereof corresponding to the engine operating state are preliminarily set in the form of a map. Then, the reference pre-injection amount and the reference after-injection amount are read from the respective maps.

Subsequently, in step S24, the PCM 70 operates to determine whether or not a current engine operating state is a transient state. For example, the PCM 70 operates to determine, based on the accelerator position detected by the accelerator position sensor, and a change rate of the accelerator position, whether or not a current engine operating state is a transient state.

As a result, when the current engine operating state is determined to be a transient state, the processing subroutine will proceed to step S25. In the step S25, the PCM 70 operates to determine current fuel ignitability in the combustion chamber 9 (hereinafter referred to as "ignition environment"), based on current estimated cylinder wall temperature value, supercharging pressure and intake manifold oxygen concentration. Specifically, regarding the estimated cylinder wall temperature value, a first threshold T1, a second threshold T2, a third threshold T3 and a fourth threshold T4 which are arranged in descending order of value are preliminarily set. Then, when the current estimated cylinder wall temperature value acquired in the step S21 is equal to or greater than T1, the ignition environment based on the current estimated cylinder wall temperature value is determined as the best ignition environment (hereinafter referred to as "ignition environment I"); when the current estimated cylinder wall temperature value is equal to or greater than T2 and less than T1, the ignition environment based on the current estimated cylinder wall temperature value is determined as the second-best ignition environment (hereinafter referred to as "ignition environment II"); when the current estimated cylinder wall temperature value is equal to or greater than T3 and less than T2, the ignition environment based on the current estimated cylinder wall temperature value is determined as the third-best ignition environment (hereinafter referred to as "ignition environment III"); when the current estimated cylinder wall temperature value is equal to or greater than T4 and less than T3, the ignition environment based on the current estimated cylinder wall temperature value is determined as the fourth-best ignition environment (hereinafter referred to as "ignition environment IV"); and, when the current estimated cylinder wall temperature value is less than T4, the ignition environment based on the current estimated cylinder wall temperature value is determined as the worst ignition environment (hereinafter referred to as "ignition environment V").

Similar to the estimated cylinder wall temperature value, regarding the supercharging pressure, a first threshold P1, a second threshold P2, a third threshold P3 and a fourth threshold P4 which are arranged in descending order of value are preliminarily set. Then, when the current supercharging pressure acquired in the step S21 is equal to or greater than P1, the ignition environment based on the current supercharging pressure is determined as the ignition environment I; when the current supercharging pressure is equal to or greater than P2 and less than P1, the ignition environment based on the current supercharging pressure is determined as the ignition environment II; when the current supercharging pressure is equal to or greater than P3 and less than P2, the ignition environment based on the current supercharging pressure is determined as the ignition environment III; when the current supercharging pressure is equal to or greater than P4 and less than P3, the ignition environment based on the current supercharging pressure is determined as the ignition environment IV; and, when the current supercharging pressure is less than P4, the ignition environment based on the current supercharging pressure is determined as the ignition environment V.

Similar to the estimated cylinder wall temperature value and the supercharging pressure, regarding the intake manifold oxygen concentration, a first threshold C1, a second threshold C2, a third threshold C3 and a fourth threshold C4 which are arranged in descending order of value are preliminarily set. Then, when the current intake manifold oxygen concentration acquired in the step S21 is equal to or greater than C1, the ignition environment based on the current intake manifold oxygen concentration is determined as the ignition environment I; when the current intake manifold oxygen concentration is equal to or greater than C2 and less than C1, the ignition environment based on the current intake manifold oxygen concentration is determined as the ignition environment II; when the current intake manifold oxygen concentration is equal to or greater than C3 and less than C2, the ignition environment based on the current intake manifold oxygen concentration is determined as the ignition environment III; when the current intake manifold oxygen concentration is equal to or greater than C4 and less than C3, the ignition environment based on the current intake manifold oxygen concentration is determined as the ignition environment IV; and, when the current intake manifold oxygen concentration is less than C4, the ignition environment based on the current intake manifold oxygen concentration is determined as the ignition environment V.

Then, the PCM 70 operates to determine, as a current ignition environment of the engine, the worst one of the ignition environments determined based on the current estimated cylinder wall temperature value, the current supercharging pressure and the current intake manifold oxygen concentration.

On the other hand, in the step S24, when the current engine operating state is determined to be not a transient state, the processing subroutine will proceed to step S26. In the step S26, the PCM 70 operates to determine a current ignition environment, based on current engine load (specifically, demanded fuel injection amount) and engine speed. In this case, the PCM 70 operates to determine an ignition environment corresponding to the current engine load and engine speed acquired in the Step S21, by referring to a map depicted in FIG. 16. In the map depicted in FIG. 16, a high load region in which the engine load is highest at the same engine speed is defined as the ignition environment I; a moderately-high load region in which the engine load is highest next to the ignition environment I is defined as the ignition environment II; and a medium load region in which the engine load is highest next to the ignition environment II is defined as the ignition environment III; and a low load region in which the engine load is lowest is defined as the ignition environment IV.

After the step S25 or S26, the processing subroutine proceeds to step S27. In the step S27, the PCM 70 operates to correct the reference pre-main time interval and the reference pre-injection amount read in the step S23, and the reference main injection timing read in the step S22, according to the ignition environment determined in the step S25 or S26, to obtain a time interval between the fuel injection end timing of the pre-injection and the fuel injection start timing of the main injection (hereinafter referred to as "pre-main time interval"), a fuel injection amount of the pre-injection (hereinafter referred to as "pre-injection amount"), and a fuel injection timing of the main injection (hereinafter referred to as "main injection timing").

Figure 17:
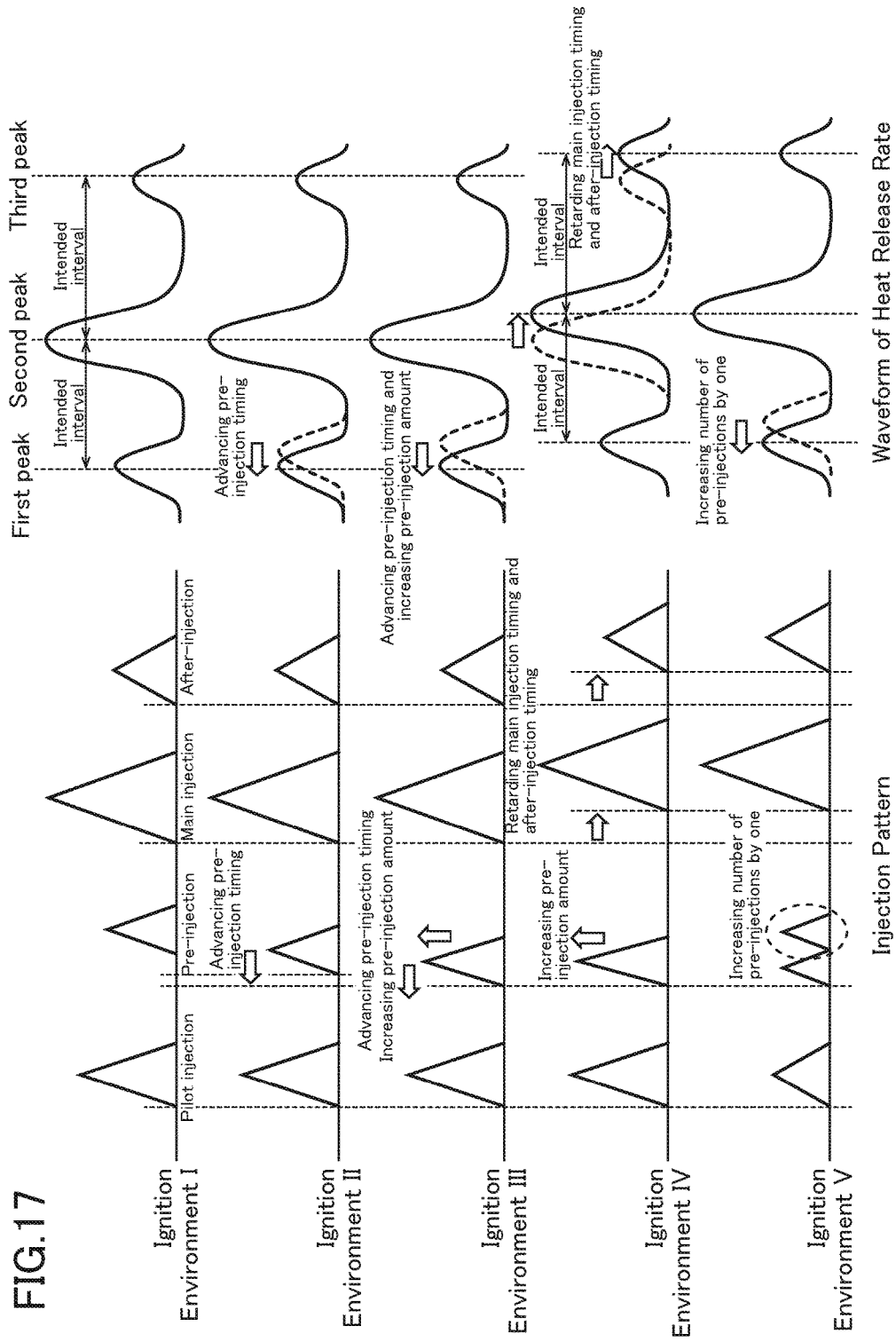
FIG. 17 is an explanatory diagram depicting various fuel injection patterns corrected depending on ignition environments, and waveforms of respective heat release rates realized by the fuel injection patterns.

FIG. 17 is an explanatory diagram depicting various fuel injection patterns corrected depending on ignition environments, and waveforms of respective heat release rates realized by the fuel injection patterns.

As mentioned above, the reference pre-main time interval and the reference main-after time interval are preliminarily set to allow valley regions of a curve indicative of a frequency characteristic of a resulting CPL to fall within respective ranges of the resonant frequency bands of the structure of the engine body, in an engine operating state allowing good fuel ignitability, i.e., in the ignition environment I. That is, when the ignition environment determined in the step S25 or S26 is the ignition environment I having the best ignitability, the PCM 70 operates to set the reference pre-main time interval as a final pre-main time interval without correcting the reference pre-main time interval. Further, the PCM 70 operates to set the reference pre-injection amount and the reference main injection timing as a final pre-injection amount and a final main injection timing without correcting the reference pre-injection amount and the reference main injection timing.

When the ignition environment determined in the step S25 or S26 is the ignition environment II, the fuel ignitability is worse than that in the ignition environment I. Thus, if a pre-injection timing is decided according to the reference pre-main time interval set based on the ignition environment I, a timing of an occurrence of a peak value of the heat release rate pertaining to the pre-injection becomes delayed with respect to that in the ignition environment I. That is, an ignition delay in the pre-injection occurs. As a result, as indicated by the dashed line a waveform of the heat release rate in the ignition environment II depicted in FIG. 17, a heat release interval between the pre-injection and the main injection undesirably becomes less than a heat release interval capable of realizing a desired CPL-frequency characteristic (i.e., "intended interval" in the waveforms of the heat release rate depicted in FIG. 17). Therefore, in the ignition environment II, as presented in the injection pattern depicted in FIG. 17, a final pre-main time interval is set by correcting the reference pre-main time interval to be increased by advancing a fuel injection timing of the pre-injection (pre-injection timing) with respect to the reference main-injection timing, to thereby prevent the heat release interval between the pre-injection and the main injection from being reduced due to badness in the ignitability, as indicated by the solid line in the waveform of the heat release rate depicted in FIG. 17.

When the ignition environment determined in the step S25 or S26 is the ignition environment III, the fuel ignitability is worse than that in the ignition environment II. Thus, the timing of the occurrence of the peak value of the heat release rate pertaining to the pre-injection becomes delayed with respect to that in the ignition environment II. Thus, it is necessary to correct the reference pre-main time interval to set a final pre-main time interval greater than that in the ignition environment II. However, if the final pre-main time interval is excessively increased, it becomes impossible to achieve an original function of the pre-injection, i.e., a function of enhancing the ignitability in the main injection. Moreover, when the pre-injection timing is advanced to some extent so as to increase the final pre-main time interval, the timing of the occurrence of the peak value of the heat release rate pertaining to the pre-injection becomes unable to be advanced any more even though the pre-injection timing is further advanced. That is, the reduction in the heat release interval between the pre-injection and the main injection due to badness in the ignitability cannot be prevented only by increasing the final pre-main time interval. Therefore, in the ignition environment III, as presented by the injection pattern depicted in FIG. 17, the final pre-main time interval is set by correcting the reference pre-main time interval to be increased by advancing the pre-injection timing with respect to the main injection timing, and a final pre-injection amount is set by correcting the reference pre-injection amount to be increased, to allow the heat release rate pertaining to the pre-injection to rise steeply and thus advance the timing of the occurrence of the peak value, to thereby prevent the heat release interval between the pre-injection and the main injection from being reduced due to badness in the ignitability, as indicated by the solid line in the waveform of the heat release rate depicted in FIG. 17.

When the ignition environment determined in the step S25 or S26 is the ignition environment IV, the fuel ignitability is worse than that in the ignition environment III. Thus, the timing of the occurrence of the peak value of the heat release rate pertaining to the pre-injection becomes delayed with respect to that in the ignition environment III. Thus, it is necessary to correct the reference pre-injection amount to set a final pre-injection amount greater than that in the ignition environment III. However, if the final pre-injection amount is excessively increased, exhaust emissions and fuel economy will be deteriorated. Moreover, in the ignition environment IV having relatively bad ignitability, simply increasing the final pre-injection amount fails to sufficiently suppress the ignition delay in the pre-injection. Therefore, in the ignition environment IV, as presented by the injection pattern depicted in FIG. 17, a final main injection timing is set by retarding the reference main injection timing, to thereby prevent the heat release interval between the pre-injection and the main injection from being reduced due to badness in the ignitability, as indicated by the solid line in the waveform of the heat release rate depicted in FIG. 17. Further, the PCM 70 operates to retard a fuel injection timing of the after-injection (after-injection timing) by an amount corresponding to a retard amount (correction amount) of the reference main injection timing, so as to maintain the reference main-after time interval to serve as a final main-after time interval even after retarding the reference main injection timing to set the final main injection timing.

When the ignition environment determined in the step S25 or S26 is the ignition environment V which specifically corresponds to a period of engine cold-start, the fuel ignitability is worse than that in the ignition environment IV. Thus, the timing of the occurrence of the peak value of the heat release rate pertaining to the pre-injection becomes delayed with respect to that in the ignition environment IV. Thus, even if the reference main injection timing is delayed to correct the reference pre-main time interval to be increased as in the ignition environment IV, it is difficult to sufficiently suppress the reduction in the ignition delay in the pre-injection and increase the heat release interval between the pre-injection and the main injection to the intended interval. Therefore, in the ignition environment V, as presented by the injection pattern depicted in FIG. 17, the final main injection timing is set by retarding the reference main injection timing, as with the ignition environment IV, and the number of times of the pre-injection by one to advance the timing of the occurrence of the peak value of the heat release rate pertaining to the pre-injection, to thereby prevent the heat release interval between the pre-injection and the main injection from being reduced due to badness in the ignitability, as indicated by the solid line in the waveform of the heat release rate depicted in FIG. 17.

Figure 18A:
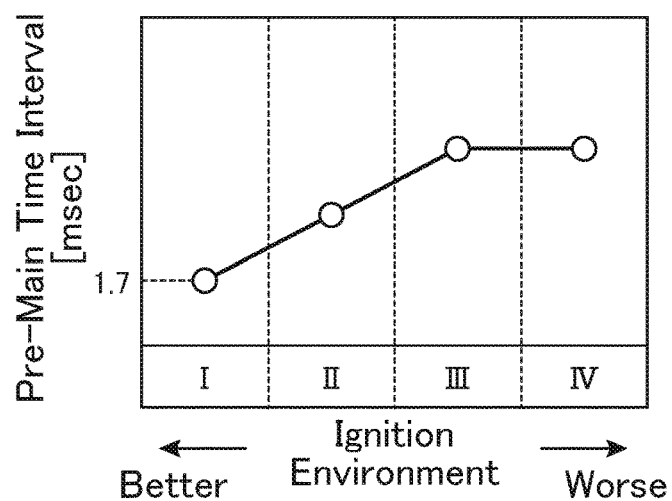
FIGS. 18A, 18B and 18C are graphs depicting a relationship between each parameter of the fuel injection mode and the ignition environments.
Figure 18B:
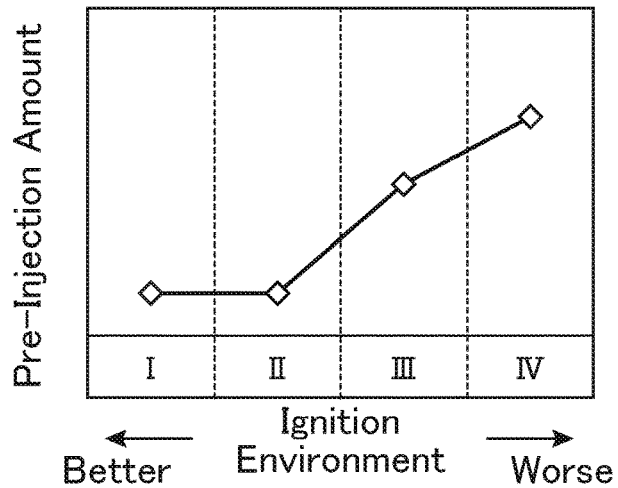
Figure 18C:
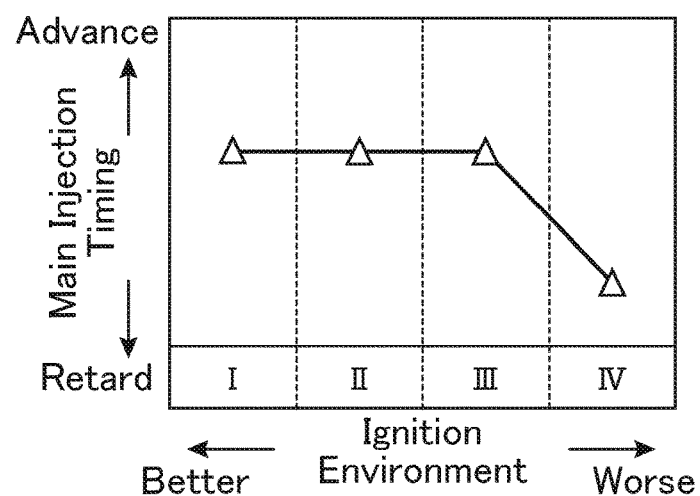

With reference to FIGS. 18A, 18B and 18C, how to correct the reference pre-main time interval, the reference pre-injection amount and the reference main injection timing depending on the ignition environments will be described. FIGS. 18A, 18B and 18C are graphs depicting a relationship between each parameter of the fuel injection mode and the ignition environments.

FIG. 18A is a graph depicting a relationship between the final pre-main time interval and the ignition environments, wherein the horizontal axis denotes the ignition environments, and the vertical axis denotes the final pre-main time interval. As depicted in FIG. 18A, as the ignitability becomes worse in order of the ignition environment I, the ignition environment II and the ignition environment II, the reference pre-main time interval is corrected to provide a larger final pre-main time interval so as to prevent the reduction in the heat release interval between the pre-injection and the main injection. Further, in the ignition environment III, the pre-ignition timing is advanced up to the limit thereof so as to increase the final pre-main time interval, so that the reference pre-main time interval cannot be corrected any more. Thus, in the ignition environment IV, the final pre-main.

FIG. 18B is a graph depicting a relationship between the final pre-injection amount and the ignition environments, wherein the horizontal axis denotes the ignition environments, and the vertical axis denotes the final pre-injection amount. As depicted in FIG. 18B, in the ignition environment II having good ignitability next to the ignition environment I, the reduction in the heat release interval between the pre-injection and the main-injection can be prevented by correcting the reference pre-main time interval to be increased. Thus, the reference pre-injection amount is not corrected. On the other hand, in the ignition environments III and IV having ignitability worse than that in the ignition environment II, the reduction in the heat release interval between the pre-injection and the main-injection cannot be sufficiently prevented only by the correction of the reference pre-main time interval. Thus, in order to suppress the ignition delay in the pre-injection, the reference pre-injection amount is corrected to be further increased as the ignitability becomes worse.

FIG. 18C is a graph depicting a relationship between the final main injection timing and the ignition environments, wherein the horizontal axis denotes the ignition environments, and the vertical axis denotes the final main injection timing. In the ignition environments II and III, the reduction in the heat release interval between the pre-injection and the main-injection can be prevented by correcting the reference pre-main time interval fails to be increased, and correcting the reference pre-injection amount to be increased. Thus, the reference main injection timing is not corrected, as depicted in FIG. 18C. On the other hand, in the ignition environment IV having ignitability worse than that in the ignition environment III, the reduction in the heat release interval between the pre-injection and the main-injection cannot be sufficiently presented only by the corrections of the reference pre-main time interval and the reference pre-injection amount. Thus, in order to prevent the reduction in the heat release interval between the pre-injection and the main-injection, the reference main injection timing is corrected to be retarded.

As above, in order to prevent the reduction in the heat release interval between the pre-injection and the main-injection, in the ignition environment II having good ignitability next to the ignition environment I, the correction of increasing the reference pre-main time interval having a small influence on exhaust emission performance and fuel economy of the engine is performed; in the ignition environment III having ignitability worse than that in the ignition environment II, the correction of increasing the reference pre-injection amount is additionally performed without exerting an excessively large influence on exhaust emission performance and fuel economy; and in the ignition environment IV having much worse ignitability, the correction of retarding the reference main injection timing is additionally performed without exerting an excessively large influence on output torque of the engine. Thus, it becomes possible to set final fuel injection timings of the pre-injection, the main injection and the after-injection which can realize a heat release interval allowing a CPL-frequency characteristic to become a desired characteristic in a broad range of ignition environments, while suppressing an influence on exhaust emission performance, fuel economy and output torque of the engine.

Returning to FIG. 15, in step S27, the PCM 70 operates to correct the reference pre-main time interval, the reference pre-injection amount and the reference main injection timing, depending on the ignition environment determined in the step S25 or S26. Then the processing subroutine proceeds to step S28. In the step S28, the PCM 70 operates to decide final fuel injection timings of the pre-injection, the main injection and the after-injection, based on the corrected pre-main time interval, the corrected pre-injection amount and the corrected main injection timing. Then, the PCM 70 terminates the fuel injection mode deciding processing, and the processing subroutine returns to the main routine.

Next, with reference to FIGS. 19 to 21, specific values of the final pre-main time interval and the main-after time interval will be described.

FIG. 19 is a graph depicting a frequency characteristic of a vibration level of knocking sound transmitted to five main bearings (MBC #1 to #5) through a main route in an in-line four-cylinder engine. As depicted in FIG. 19, the vibration level of the knocking sound has peaks around 1300 Hz, 1700 Hz, 2500 Hz and 3500 Hz. These peak frequencies can be considered to indicate resonant frequencies in the main route. The resonant frequencies in the main route are determined mainly by balance between a mass of the piston 4 and rigidity of the connecting rod 8, and have similar values, irrespective of a type of engine, such as a gasoline engine and a diesel engine, or an engine size. In other words, it is considered that, in any engine, knocking sound in the entire engine body can be effectively reduced by reducing knocking sound having frequency bands including respective peaks around 1300 Hz, 1700 Hz, 2500 Hz and 3500 Hz.

Among these resonant frequency bands, as for the frequency band having a peak around a highest frequency of 3500 Hz, even though a mechanical mechanism for canceling out a structural resonance (specifically, the dynamic vibration absorber 90 for suppressing stretching resonance of the connecting rod 8 during a combustion stroke) is provided in the engine body 1, an increase in weight of the engine body 1 is small. Thus, a reduction of knocking sound having a peak around 3500 Hz is realized by the dynamic vibration absorber 90, and, in order to reduce knocking sound having peaks around 1300 Hz, 1700 Hz and 2500 Hz, the PCM 70 is configured to control the pre-main time interval and the main-after time interval to allow valley regions of a curve indicative of a CPL-frequency characteristic to appear in given frequency bands including respective peaks around 1300 Hz, 1700 Hz and 2500 Hz.

Figure 20:
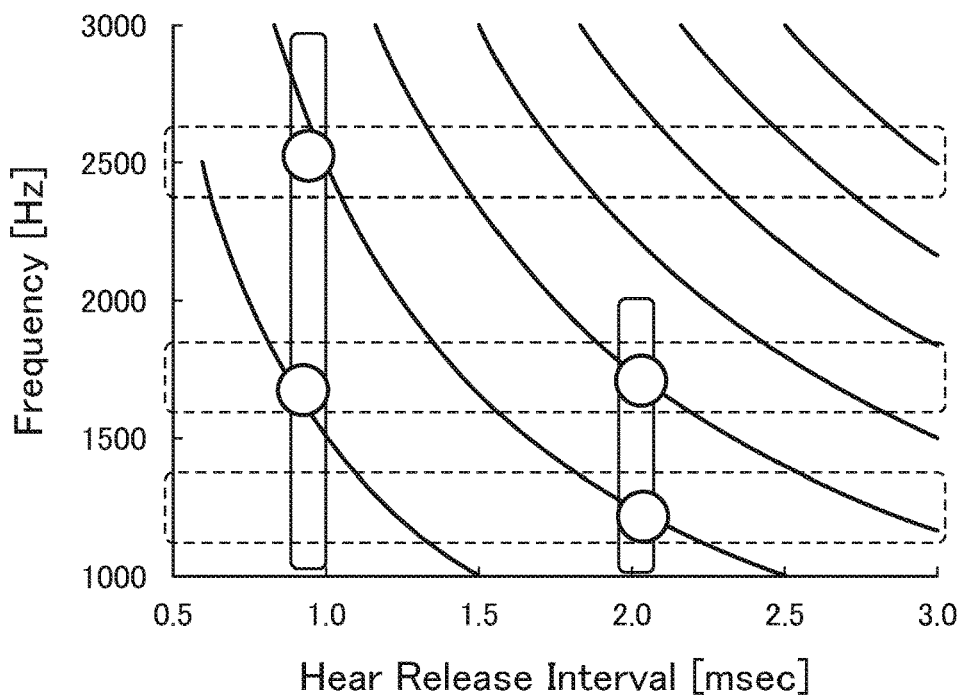
FIG. 20 is a graph depicting a relationship of a heat release interval and a frequency at a valley in a curve indicative of a CPL-frequency characteristic.

FIG. 20 is a graph depicting a relationship of a heat release interval and a frequency at a valley in a curve indicative of a CPL-frequency characteristic. In FIG. 20, the horizontal axis denotes the heat release interval, and the vertical axis denotes a frequency of a combustion pressure wave. In FIG. 20, a curve indicated by the solid line represents a frequency at which a valley occurs in the curve indicative of the CPL-frequency characteristic as a result of a phenomenon that combustion pressure waves caused by temporally adjacent two fuel injections (i.e., the pre-injection and the main injection, or the main injection and the after-injection) interfere with each other in such a manner as to cancel each other out.

As depicted in FIG. 20, when the heat release interval is set to about 0.9 msec, valleys occur in the curve indicative of the CPL-frequency characteristic, in respective frequency bands including peaks around 1700 Hz and 2500 Hz. On the other hand, when the heat release interval is set to about 2.0 msec, valleys occur in the curve indicative of the CPL-frequency characteristic, in respective frequency bands including peaks around 1300 Hz and 1700 Hz. As depicted in FIG. 19, among the peaks around 1300 Hz, 1700 Hz and 2500 Hz, the peak around 1700 Hz is largest. Therefore, it is desirable to set the pre-main time interval such that the heat release interval between the pre-injection and the main injection becomes about 0.9 msec, and set the main-after time interval such that the heat release interval between the main injection and the after-injection becomes about 2.0 msec. Specifically, as to the pre-main time interval, considering that there is a need to advance the pre-injection timing in view of badness in the fuel ignitability, it is desirable to set the pre-main time interval to about 1.7 msec which is greater than the desired heat release interval 0.9 msec. On the other hand, as to the main-after time interval, in view of good ignitability in the after-injection, it is desirable to set the main-after time interval to 2.0 msec which is equal to the desired heat release interval 2.0 msec.

Thus, regarding the frequency band including the maximum peak around 1700 Hz, it becomes possible to allow combustion pressure waves caused by the pre-injection and the main-injection and combustion pressure waves caused by the main injection and the after-injection to be brought into interference with each other in such a manner as to cancel each other out, thereby enlarging dimensions of valleys in a curve indicative of a CPL-frequency characteristic. That is, it becomes possible to effectively reduce knocking sound having a frequency band including a peak around 1700 Hz.

Figure 21:
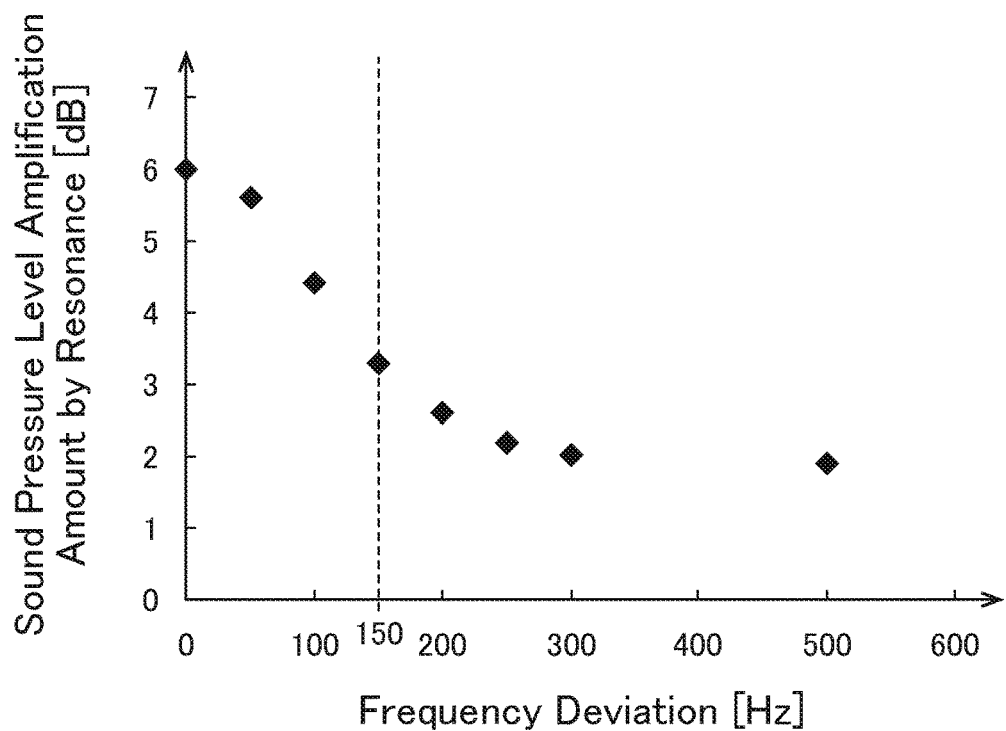
FIG. 21 is a graph depicting a relationship of a frequency deviation between two mutually-interfering vibrations, and an amount of sound pressure level amplification caused by resonance of the vibrations.

FIG. 21 is a graph depicting a relationship of a frequency deviation between two mutually-interfering vibrations, and an amount of sound pressure level amplification caused by resonance of the vibrations. As depicted in FIG. 21, in the case where two vibrations interfere with each other such that peaks in respective waveforms thereof overlap each other, an amount of sound pressure level amplification caused by resonance of the vibrations is sharply increased when a frequency deviation between the two vibrations becomes less than 150 Hz. This means that, by setting, to 150 Hz or less, a deviation between a peak resonant frequency in the main route and a frequency at a valley in a curve indicative of a CPL-frequency characteristic, a structural resonance in a resonance frequency band can be significantly suppressed to adequately reduce knocking sound.

Specifically, to the pre-main time interval is adjusted to allow a frequency in a valley region of a curve indicative of a CPL-frequency characteristic to become 1700 Hz±150 Hz and 2500 Hz±150 Hz. According to the formula (2) and FIG. 20, when the pre-main time interval is set to 1.7±0.1 msec, the heat release interval between the pre-injection and the main injection can be controlled such that the frequency in the valley region of the curve indicative of the CPL-frequency characteristic becomes 1700 Hz±150 Hz and 2500 Hz±150 Hz. Further, when the main-after time interval is set to 2.0±0.1 msec, the heat release interval between the main injection and the after-injection can be controlled such that the frequency in the valley region of the curve indicative of the CPL-frequency characteristic becomes 1300 Hz±150 Hz and 1700 Hz±150 Hz.

Next, advantageous effects of the compression self-ignition engine fuel injection control method and device according to the above embodiment will be described.

First, when the heat release interval between the pre-injection and the main injection is set to 1.7±0.1 msec, the heat release interval between the pre-injection and the main injection can be controlled such that a frequency in a valley region of a curve indicative of a frequency characteristic of a combustion pressure wave caused by the pre-injection and the main injection becomes 1700 Hz±150 Hz and 2500 Hz±150 Hz, thereby effectively reducing knocking sound corresponding to 1700 Hz and 2500 Hz among major resonant frequencies of the structure of the engine body. In this method, a level of the entirety of the combustion pressure wave is never changed, so that there is no risk of causing deterioration in fuel economy and exhaust emissions. Further, it is not necessary to additionally provide a sound insulator or the like, so that there is no risk of causing increases in cost and weight of the engine.

Further, when the heat release interval between the main injection and the after-injection is set to 2.0±0.1 msec, the heat release interval between the main injection and the after-injection can be controlled such that a frequency in a valley region of a curve indicative of a frequency characteristic of a combustion pressure wave caused by the main injection and the after-injection becomes 1300 Hz±150 Hz and 1700 Hz±150 Hz, thereby effectively reducing knocking sound corresponding to 1300 Hz and 1700 Hz among major resonant frequencies of the structure of the engine body. In particular, both of the heat release interval between the pre-injection and the main injection and the heat release interval between the main injection and the after-injection are controlled such that a frequency in a valley region of a curve indicative of a frequency characteristic of a combustion pressure wave caused by these fuel injections to become 1700 Hz±150 Hz. Thus, it becomes possible to enlarge dimensions of the valley region occurring at 1700 Hz±150 Hz in the curve indicative of the frequency characteristic of the combustion pressure wave, thereby effectively reducing knocking sound corresponding to a particularly large peak around 1700 Hz among major resonant frequencies of the structure of the engine body.

In the above embodiment, as the engine load becomes lower at the same engine speed, i.e., fuel ignitability becomes worse, the pre-injection timing is advanced to increase the interval between the pre-injection and the main injection, so that it becomes possible to prevent the heat release interval between the pre-injection and the main injection from being reduced due to badness in the ignitability, and thus adequately reduce respective knocking sound components corresponding to 1700 Hz±150 Hz and 2500 Hz±150 Hz which are resonant frequency bands of the structure of the engine body, in a broad range of ignition environments.

Further, as the engine load becomes lower at the same engine speed, i.e., fuel ignitability becomes worse, the pre-injection amount is increased to enhance the fuel ignitability, so that it becomes possible to prevent the heat release interval between the pre-injection and the main injection from being reduced due to badness in the fuel ignitability, and thus adequately reduce respective knocking sound components corresponding to 1700 Hz±150 Hz and 2500 Hz±150 Hz which are resonant frequency bands of the structure of the engine body, in a broad range of ignition environments.

Further, as the engine load becomes lower at the same engine speed, i.e., fuel ignitability becomes worse, the main injection timing is retarded, and the after-injection timing is also retarded so as to maintain the interval between the main injection and the after-injection, so that it becomes possible to prevent the heat release interval between the pre-injection and the main injection from being reduced due to badness in the fuel ignitability, even in a situation where the pre-injection timing cannot be advanced. Further, when the main injection timing is retarded according to lowering of the engine load, the after-injection timing is also retarded to maintain the interval between the main injection and the after-injection, so that, even when the main injection timing is retarded to prevent the heat release interval between the pre-injection and the main injection from being reduced due to badness in the fuel ignitability, the heat release interval can be controlled to allow frequencies in valley regions of a curve indicative of a frequency characteristic of combustion pressure waves caused by the main injection and after-injection to fall within respective ranges of 1300 Hz±150 Hz and 1700 Hz±150 Hz which are a plurality of resonant frequency bands of the structure of the engine body, thereby adequately reducing respective knocking sound components corresponding to the plurality of resonant frequency bands of the structure of the engine body, in a broad range of ignition environments.

In the above embodiment, in the ignition environment II having good ignitability next to the ignition environment I, only the control of the pre-injection timing having a small influence on exhaust emission performance and fuel economy of the engine is performed to prevent the reduction in the heat release interval between the pre-injection and the main-injection; in the ignition environment III having ignitability worse than that in the ignition environment II, the pre-injection amount is increased to enhance ignitability in the pre-injection; and in the ignition environment IV having much worse ignitability, the main injection timing is retarded to reliably prevent the reduction in the heat release interval between the pre-injection and the main-injection.

Thus, it becomes possible to reliably prevent the reduction in the heat release interval between the pre-injection and the main-injection due to badness in the ignitability, while suppressing an influence on exhaust emission performance, fuel economy and output torque of the engine, thereby adequately reducing respective knocking sound components corresponding to the plurality of resonant frequency bands of the structure of the engine body, in a broader range of ignition environments.

In the above embodiment, as a cylinder wall temperature, a supercharging pressure and/or an intake oxygen concentration becomes lower, the interval between the pre-injection and the main injection is increased, so that, even in a situation where the cylinder wall temperature, the supercharging pressure and/or the intake oxygen concentration becomes lower, i.e., the ignitability becomes worse, it becomes to reliably present the reduction in the heat release interval between the pre-injection and the main-injection, thereby adequately reducing respective knocking sound components corresponding to 1300 Hz±150 Hz and 1700 Hz±150 Hz which are the plurality of resonant frequency bands of the structure of the engine body, in a broad range of ignition environments.

In the above embodiment, the dynamic vibration absorber 90 is employed to suppress resonance at a frequency bond having a peak around a highest frequency of 3500 Hz, among the plurality of resonant frequency bands of the structure of the engine body, and the PCM 70 is configured to control the pre-main time interval and the main-after time interval to allow valley regions of a curve indicative of a CPL-frequency characteristic to appear in given frequency bands including peaks around 1300 Hz, 1700 Hz and 2500 Hz, so as to reduce knocking sound having peaks around 1300 Hz, 1700 Hz and 2500 Hz in low frequency-side ones of a plurality of resonant frequency bands. That is, knock sound components corresponding to a high frequency-side resonant frequency band which can be handled by providing a mechanical mechanism with a slight increase in weight of the engine body can be reduced by the dynamic vibration absorber, and knock sound components corresponding to a low frequency-side resonant frequency band which needs to be handled by providing a mechanical mechanism causing an increase in weight of the engine body can be reduced by the control of the intervals between fuel injections. This makes it possible to adequately reduce respective knocking sound components corresponding to the plurality of resonant frequency bands of the structure of the engine body, while minimizing an increase in weight of the engine body.

What is claimed is:

1. A fuel injection control method for a compression self-ignition engine configured to, during one combustion stroke, perform multiple fuel injections to induce multiple combustions in a cylinder, comprising:
    acquiring an engine load;
    setting an interval between a timing of a pre-injection and a main injection in the multiple fuel injections, so as to allow valley regions of a curve indicative of a frequency characteristic of a combustion pressure wave generated by the multiple combustions to fall within respective ranges of a plurality of resonant frequency bands of a structure of an engine body of the engine, such that when the engine load becomes low, the interval is set to larger than when the engine load is high by advancing a start timing of the pre-injection; and
    increasing a fuel injection amount of the pre-injection as the engine load becomes lower at a same engine speed.

2. The fuel injection control method as recited in claim 1, which further comprises: setting an injection timing of the main injection to a timing corresponding to a given crank angle; setting an injection timing of the pre-injection and optionally an injection timing of an after-injection in the multiple fuel injections, based on the set fuel injection interval; and controlling a fuel injection unit to perform, at the set injection timings, the pre-injection, the main injection and optionally the after-injection, respectively.

3. A fuel injection control device for a compression self-ignition engine configured to, during one combustion stroke, perform multiple fuel injections to induce multiple combustions in a cylinder, comprising:
    a controller acquiring an engine load and setting an interval between a timing of a pre-injection and a main injection in the multiple fuel injections, so as to allow valley regions of a curve indicative of a frequency characteristic of a combustion pressure wave generated by the multiple combustions to fall within respective ranges of a plurality of resonant frequency bands of a structure of an engine body of the engine, wherein when the engine load is low, the controller makes the interval larger than when the engine load is high by advancing a start timing of the pre-injection and increases a fuel injection amount of the pre-injection.

4. The fuel injection control device as recited in claim 3, wherein the controller fixes an injection timing of the main injection, and advances an injection timing of the pre-injection greater as the engine load becomes lower at the same engine speed.

5. The fuel injection control device as recited in claim 3, wherein the controller retards an injection timing of the main injection greater as the engine load becomes lower at the same engine speed.

6. The fuel injection control device as recited in claim 5, wherein the multiple injections comprise the pre-injection, the main injection and an after-injection, and wherein the controller, concurrently with retarding the injection timing of the main injection greater as the engine load becomes lower at the same engine speed, retards an injection timing of the after-injection so as to maintain an interval between the main injection and the after-injection.

7. The fuel injection control device as recited in claim 3, wherein, on an assumption that an engine operating state is divided into a high load region in which the engine load is relatively high, a medium load region in which the engine load is lower than that in the high load region, and a low load region in which the engine load is lower than that in the medium load region, the controller, in the medium load region, advances an injection timing of the pre-injection and increases the fuel injection amount of the pre-injection, with respect to those in the high load region, and, in the low load region, increases the fuel injection amount of the pre-injection with respect to that in the medium load region, and retards an injection timing of the main injection with respect to that in each of the high load region and the medium load region.

8. The fuel injection control device as recited in claim 3, wherein the controller sets an injection timing of the main injection to a timing corresponding to a given crank angle; sets an injection timing of the pre-injection and optionally an injection timing of an after-injection in the multiple fuel injections, based on the set fuel injection interval; and controls a fuel injection unit to perform, at the set injection timings, the pre-injection, the main injection and optionally the after-injection, respectively.

9. A fuel injection control method for a compression self-ignition engine configured to, during one combustion stroke, perform multiple fuel injections to induce multiple combustions in a cylinder, comprising:

acquiring an engine load; and setting a first interval between a timing of a pre-injection and a main injection in the multiple fuel injections and a second interval between a timing of a main injection and an after-injection in the multiple fuel injections, such that when the engine load becomes low, the first interval is set to larger than when the engine load is high by advancing a start timing of the pre-injection, and the timing of the main injection and the after-injection is retarded by maintaining the second interval.

* * * * *